(12) United States Patent
Fisher et al.

(10) Patent No.: US 9,901,825 B2
(45) Date of Patent: Feb. 27, 2018

(54) SYSTEM, APPARATUS, AND METHOD OF MONITORING INTERACTIONS

(71) Applicant: LEGACY GAME SYSTEMS LLC, Asheville, NC (US)

(72) Inventors: Sidney F. Fisher, Asheville, NC (US); Matthew J. Graham, Raleigh, NC (US); Ford M. Ivey, Asheville, NC (US); Vipresh Jain, Cary, NC (US); Brian T. McGlauflin, Azusa, CA (US)

(73) Assignee: LEGACY GAME SYSTEMS LLC, Asheville, NC (US)

( * ) Notice: Subject to any disclaimer, the term of this patent is extended or adjusted under 35 U.S.C. 154(b) by 0 days.

(21) Appl. No.: 15/181,684

(22) Filed: Jun. 14, 2016

(65) Prior Publication Data

US 2016/0346694 A1    Dec. 1, 2016

Related U.S. Application Data

(63) Continuation-in-part of application No. 14/456,500, filed on Aug. 11, 2014, now Pat. No. 9,694,291.

(60) Provisional application No. 61/864,063, filed on Aug. 9, 2013.

(51) Int. Cl.

| | | |
|---|---|---|
| A63F 13/58 | (2014.01) |
| A63F 13/211 | (2014.01) |
| A63F 13/31 | (2014.01) |
| A63F 13/327 | (2014.01) |
| A63F 13/79 | (2014.01) |
| A63F 13/216 | (2014.01) |
| A63F 13/86 | (2014.01) |
| A63F 13/34 | (2014.01) |
| A63F 13/352 | (2014.01) |
| A63F 13/245 | (2014.01) |
| A63F 13/212 | (2014.01) |
| A63F 13/822 | (2014.01) |
| A63F 13/49 | (2014.01) |

(52) U.S. Cl.
CPC ............ *A63F 13/58* (2014.09); *A63F 13/211* (2014.09); *A63F 13/212* (2014.09); *A63F 13/216* (2014.09); *A63F 13/245* (2014.09); *A63F 13/31* (2014.09); *A63F 13/327* (2014.09); *A63F 13/34* (2014.09); *A63F 13/352* (2014.09); *A63F 13/79* (2014.09); *A63F 13/86* (2014.09); *A63F 13/49* (2014.09); *A63F 13/822* (2014.09); *A63F 2300/575* (2013.01)

(58) Field of Classification Search
CPC ............................ G07F 17/32; G07F 17/3255
See application file for complete search history.

(56) References Cited

U.S. PATENT DOCUMENTS 5,672,108 A * 9/1997 Lam ...................... A63F 9/0291
463/2
6,071,166 A * 6/2000 Lebensfeld ........... A63F 9/0291
446/175

(Continued)

*Primary Examiner* — David L Lewis
*Assistant Examiner* — Shauna-Kay Hall
(74) *Attorney, Agent, or Firm* — Maier & Maier, PLLC

(57) ABSTRACT

An apparatus and method for monitoring live-action gameplay interactions may be provided. A weapon device, body sensors, and a hub may be used to detect interactions, such as weapon strikes or casting of a spell. Interactions may be communicated to a game application on a mobile device for updating gameplay data.

10 Claims, 18 Drawing Sheets

(56) References Cited

U.S. PATENT DOCUMENTS

| | | | |
|---|---|---|---|
| 6,302,796 B1* | 10/2001 | Lebensfeld | A63F 9/0291 446/175 |
| 7,435,179 B1* | 10/2008 | Ford | A63F 13/12 434/11 |
| 7,922,586 B2 | 4/2011 | Heckendorf et al. | |
| 7,946,919 B2 | 5/2011 | Piccionelli | |
| 8,550,916 B2 | 10/2013 | Raynal | |
| 8,702,515 B2 | 4/2014 | Weston et al. | |
| 8,721,460 B2 | 5/2014 | Rosenblum | |
| 2002/0111201 A1 | 8/2002 | Lang | |
| 2003/0224855 A1 | 12/2003 | Cunningham | |
| 2005/0049022 A1 | 3/2005 | Mullen | |
| 2006/0040720 A1* | 2/2006 | Harrison, Jr. | A63F 9/24 463/9 |
| 2006/0223635 A1* | 10/2006 | Rosenberg | A63F 13/10 463/37 |
| 2006/0246922 A1* | 11/2006 | Gasbarro | A61B 5/0002 455/456.6 |
| 2007/0167224 A1 | 7/2007 | Sprogis | |
| 2007/0190494 A1* | 8/2007 | Rosenberg | A63F 13/12 434/11 |
| 2007/0297117 A1* | 12/2007 | Elliott, Jr. | F41A 33/02 361/232 |
| 2008/0220693 A1 | 9/2008 | Cuisinier | |
| 2009/0011832 A1* | 1/2009 | Rofougaran | H04M 1/72544 463/41 |
| 2009/0017913 A1 | 1/2009 | Bell et al. | |
| 2009/0093307 A1* | 4/2009 | Miyaki | A63F 13/06 463/37 |
| 2009/0280901 A1* | 11/2009 | Casparian | A63F 13/06 463/37 |
| 2010/0093414 A1* | 4/2010 | Jensen | A63F 9/24 463/5 |
| 2011/0312418 A1 | 12/2011 | Page | |
| 2013/0072308 A1 | 3/2013 | Peck | |
| 2013/0173032 A1* | 7/2013 | Rom | A63F 13/42 700/91 |
| 2014/0287806 A1* | 9/2014 | Balachandreswaran | A63F 13/00 463/7 |
| 2016/0184698 A1* | 6/2016 | Tan | A63F 13/216 463/2 |

\* cited by examiner

SYSTEM, APPARATUS, AND METHOD OF MONITORING INTERACTIONS

PRIORITY CLAIM

This is a Continuation-In-Part application of a non-provisional application having application Ser. No. 14/456,500, which claims priority to Provisional Application No. 61/864,063, the contents of which are hereby incorporated by reference in their entirety.

BACKGROUND

The present disclosure relates generally to the field of role-play simulation, and more specifically to the field of live-action role-play.

Live-action role-playing games, already popular, have become more prevalent with the advancement and widespread accessibility of mobile computing. Mobile computing devices now make it easier for players to connect and interact with one another as well as game servers. Many role-play games, however, require specialized equipment for each game and do not allow for simultaneous customization or accurate tracking of all attributes which players in a game are assigned (for instance health levels, types and number of weapons, ammunition, and the like). Live-action role-play games often rely on a simplified laser gun and tag system.

Furthermore, current live-action role-playing games often operate on the honor system requiring players to keep track of their character's attributes and correctly track interaction with other players in the game and the respective consequences.

SUMMARY

According to an exemplary embodiment, an apparatus for monitoring interactions may be provided. An apparatus for monitoring interactions may include a weapon device associated with each participant, at least one body sensor located on each participant's body, and a hub associated with each participant. The weapon device of an attacker may be configured to communicate the weapon device's presence to the at least one body sensor of a defendant within communication range. The weapon device may further be configured to communicate an identification and a time-stamp to the hub of the defendant within communication range when the weapon device detects a hit. The at least one body sensor of the defendant may communicate an identification and a time-stamp to the hub of the defendant when a communication of the weapon device's presence is received. The hub of the defendant may determine a valid interaction by matching the time-stamps communicated by the weapon device of the attacker and the at least one body sensor of the defendant. The hub of the defendant may then communicate the interaction data to a game application on a mobile device.

According to another exemplary embodiment, a method of monitoring a weapon strike may be provided. The method may include linking participant hardware components, causing an attacker's weapon device to communicate its presence when motion is detected, and allowing a defendant's body sensor to communicate its identification and time to a defendant's hub when the defendant's body sensor detects the presence of the attacker's weapon. The attacker's weapon may further be allowed to communicate an identification and time when its accelerometer detects a hit. The defendant's hub may match identification and time data from the attacker's weapon device and the defendant's body sensor to determine a valid strike, which may then be reported to a game application on a mobile device.

According to yet another exemplary embodiment, a method of monitoring a spell may be provided. A method of monitoring a spell may include linking participant hardware components, pre-programming spell data and a spell selection button, and allowing a participant to attempt to cast a spell by selecting the spell selection button. The spell caster's hub may monitor for and read an ID-tag of a defendant within range. The caster's hub may communicate the identification of the defendant within range and the spell data to the defendant's hub. The defendant's hub may pass the received identification and spell data to a mobile device. A game application on the mobile device may verify the identification of the defendant hit by the spell and update gameplay data accordingly.

BRIEF DESCRIPTION OF THE DRAWINGS

Advantages of embodiments of the present invention will be apparent from the following detailed description of the exemplary embodiments. The following detailed description should be considered in conjunction with the accompanying figures in which.

Exemplary

Exemplary

Exemplary

Exemplary

Exemplary

Exemplary

Exemplary

Exemplary

Exemplary

Exemplary

Exemplary

Exemplary

Exemplary

Exemplary

Exemplary

Exemplary

Exemplary

Exemplary

Exemplary

DETAILED DESCRIPTION

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage, or mode of operation.

Further, many of the embodiments described herein may be described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

Figure 1:
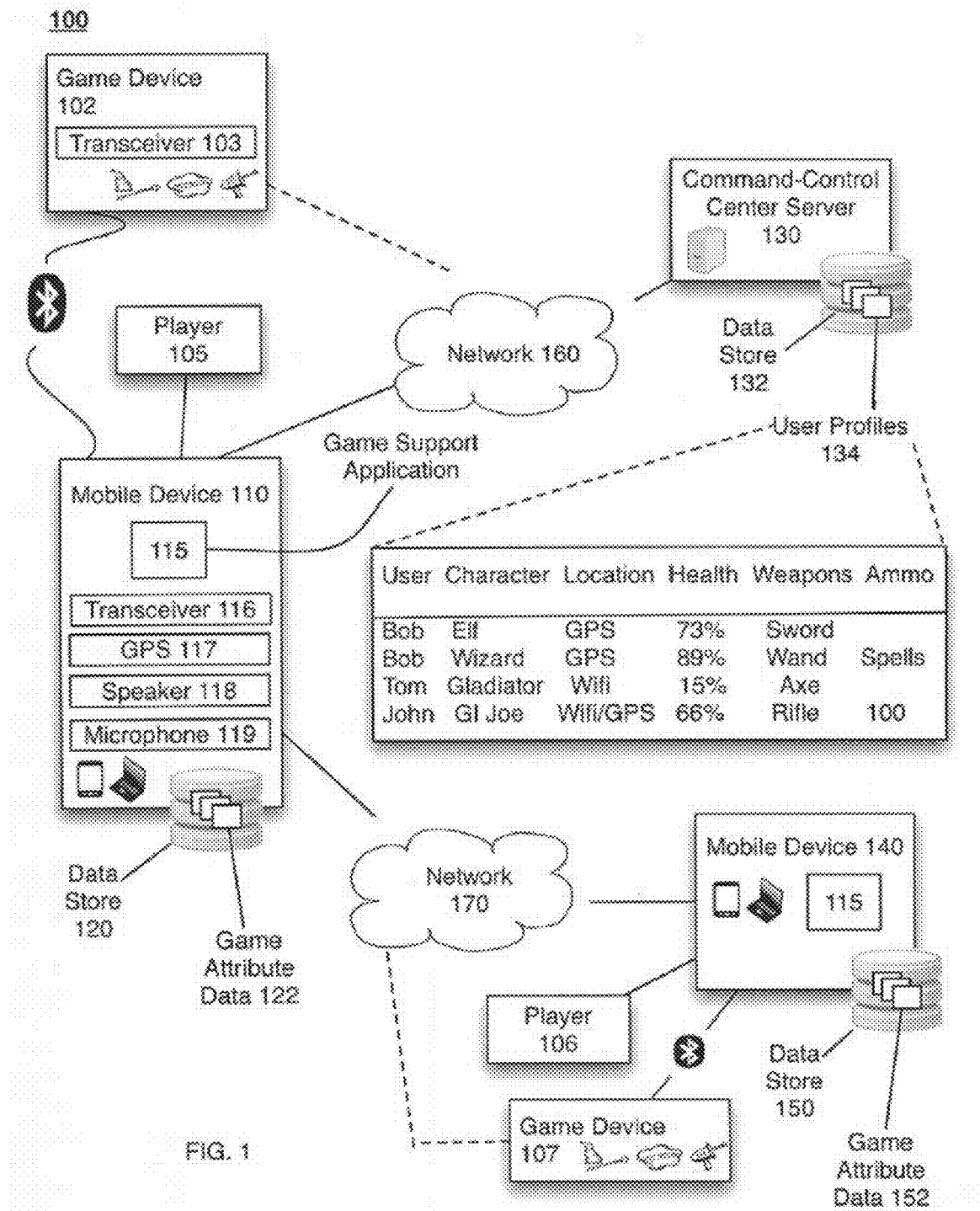
FIG. 1 shows a schematic diagram of a system for interactive game support.

According to at least one exemplary embodiment, a system for interactive role play game support may be disclosed. Referring to FIG. 1, a schematic diagram of an exemplary system for interactive game support may be provided. System 100 can include one or more players 105, 106, one or more game devices 102 and 107, a mobile device 110 and 140 with a game support application 115 running on mobile device 110, 140, one or more networks 160 and 170, and one or more command control servers 130, and, if more than one command-control server is used, the command-control servers can in one embodiment be connected by one or more networks.

In one embodiment, players 105 and 106 can utilize mobile devices 110 and 140 respectively to interact with one another and a command control center server 130 via network 160 and/or network 170 to establish and participate in a live interactive role-playing game managed by game support application 115. In another embodiment, players 105 and 106 can utilize game support application 115 on their respective mobile devices 110, 140 to create and play a fully customized or pre-defined interactive role playing game without having to connect to command-control center server 130. In this embodiment, players can utilize game support application 115, to, for example, define the playing field, set up player or character profiles, utilize previously established player or character profiles, track player specific and general game attribute data 122 and the like.

Player 105, 106 can be an individual user of the system, part of a team of game players, and the like. Game device 102 and 107 can be a variety of devices designed to facilitate live-action role playing games replicating weapons, armor, or the like, such as a laser gun, a wand, specialized interactive glasses, gloves, rings, braces, swords, etc. Game device 102, 107 may be configured to recognize interactions with other game devices. Game device interactions may include contact sensor interaction, laser and sensor interactions, and other forms of interactions as would be understood by a person having ordinary skill in the art. Game device 102 and 107 can include a transceiver 103 to interact with mobile device 110 and 140 for utilization of the disclosed game support system. Transceiver 103 can also be in the form of a separate receiver and transmitter and allow for connectivity via various technologies, including but not limited to Bluetooth, Ethernet, WiFi, etc., as would be understood by a person having ordinary skill in the art. In some exemplary embodiments, game device 102, 107 can further include a transceiver, a GPS, a speaker, a microphone, and may additionally be equipped with game support software.

Mobile device 110, 140 can be, for example, a mobile phone (such as an iPhone, Android smartphone, Windows based smartphone, etc.), tablet and the like. Alternatively, mobile device may be configured specifically for live action role play. Mobile device 110, 140 can include game support application 115, transceiver 116, GPS 117, speaker 118, and microphone 119. Game support application 115 may be a software application designed to operate on a mobile device 110, 140. Game support application 115 can provide for various interactive game rules, settings, and enforcement. In one embodiment, game support application 115 can, with or without communication with a central command-control center server 130, track and push settings and attributes based on specialized game rules to game device 102, 107. Settings and attributes for interactive games can include items such as damage per round, number of rounds, rate of fire, automatic or semi-automatic fire, military simulation, specialized sounds like science fiction sounds, magic spells, player health (which could be tracked based on a player's character and the type of weapon or device used against the player for each attack), armor level, healing abilities, muzzle flash and the like. In some embodiments, game device attributes may be maintained through the game device itself, such that multiple players may use the same game device 102, 107. This may allow a player to pick up a game device 102, 107 from an expired player.

It should be noted that users can acquire these features and attributes in one embodiment through pre-sets done by a command-control system or within the game support application by multiple players when no command-control server is utilized. In another embodiment, users can acquire attributes through game interaction such as gaining player experience levels, picking up new devices, trading with other players or a game master, bartering for or selling devices and the like. Attributes can be game or event specific or can be carried over between game types and/or event events when allowed.

Mobile device 110, 140 can also include GPS 117 to facilitate defining bounds of a playing field via application 115 or ensuring enforcement of game specific rules such as remaining within pre-defined bounds of a playing field. GPS 117 may also be utilized to track player movement and actions within the defined bounds of the playing field for the interactive game. In some embodiments, GPS 117 may be used via application 115 to find nearby games, find a specific playing field, or to make a player eligible to join a game. GPS 117 may also be used by a player to identify a current location or points of interest on a playing field. For example, GPS 117 may be able to identify a player's current location, teammate locations, accessory locations, a home base, or those of an enemy. As shown in exemplary FIG. 2, a map view of a playing field may be displayed through a command-control center server 130 or game support application

115. The map view may be available during a game or to recap a game. Speakers 118 can be a set of one or more speakers, which may produce sound within an environment external to a user and/or may be implemented within headphones and/or headgear specific to a user. In an exemplary configuration, the speakers 264 can include noise cancellation abilities. In another exemplary configuration, the speakers 264 can be used to create a closed audio environment, enhancing player immersion in the interactive game environment. In yet further exemplary configurations, the speakers can be integrated into game device 102 and 107 instead of or in addition to speakers in mobile device 110, 140.

Microphone 119 can be utilized in conjunction with speaker 118 to establish walkie-talkie functionality or facilitate communications between players 105, 106 and/or players 105, 106 and a game master. These communications can be on separate frequencies to facilitate team formation, cohesion, morale, and the like in interactive games. In another embodiment, microphone 119 can work in conjunction with, for example, speech processing software to allow players 105, 106 to speak commands for game devices 102, 107 that can be interpreted and applied to players' game attribute data measures. For example, a player 105, 106 could hold down an activate button (typically utilized to signal voice input to devices) on his or her wand game device 102, 107 or mobile device 110, 140 and speak the name of a spell to utilize against a player opponent. Similarly to speaker 118, microphone 119 could be embodied in game device 102, 107 in addition to or instead of mobile device 110, 140.

Mobile device 110, 140 can also include data store 120, 150 which can maintain game attribute data 122, 152. Game attribute data 122, 152 can be separated by game or character or a combination thereof. Mobile device 110, 140's data store 120, 150 can also maintain multiple profiles within game attribute data 122, 152 for multiple players utilizing the devices at separate times. As previously mentioned, mobile device 110, 140 can communicate with command-control server 130 via network 160 and/or network 170 to allow players 102, 106 to take part in a command-control center server hosted interactive role playing game. The game devices 102, 107, as well as mobile devices 110, 140 can communicate with each other and/or the command-control server 130 in real time to provide statistics such as which player is shooting or putting a spell on another player, the exact effects of the weapon or spell used on the specific player by character type and the like. It should be noted that game support application 115 can recognize that various types of weapons can inflict various types and levels of damage on different players (and can be further customized by player type, for example recognizing different effects on an alien versus human character and the like).

Pursuant to the above description, an exemplary embodiment may include a wand as a game device 102, 107. The wand may be configured to interact with other game devices 102, 107 such as other wands or receiving units disposed on a fellow player. An exemplary receiving unit may be configured as clothing, armor, another wand, or the like. The wand may interact with receiving units by transmitting an infrared beam, which may carry specific codes to communicate desired effects. For example, the signal may communicate to the receiving unit of a fellow player that their health has been damaged or that they have been frozen in place, among other interactions as would be understood by a person having ordinary skill in the art. The receiving units or game support application 115 may be configured to apply certain protections based on character attributes or preferences. This may include ignoring damage instruction from received signals. Mobile devices running game support application 115 and communicating with receiving units may project responses based on device interactions. Responses may include audible or visual responses, which may describe the effects of an interaction, such as a spell transmitted by a wand. This may indicate to players how to react to various interactions. In some embodiments, a player's character may expire based on interactions, which may trigger the player's devices 102, 107 to prohibit future interactions.

In other embodiments, game devices 102, 107 may incorporate the use of fiber optic switches to monitor interactions. For example, a sword or similar device may include fiber optics disposed along an exterior surface. The fiber optics may include a fiber optic filament. Players or other game devices 102, 107 may be wrapped in fiber optic cloth or other filament. During gameplay, the fiber optic filaments of one game device 102, 107 may interact with the filament of a second game device 102, 107. In an exemplary interaction, a fiber optic cloth or filament may pick up and focus leaked signals from a fiber optic filament disposed on an interacting device, such as a sword. A sensor or detector in communication with the cloth or other filament may receive the leaked signal. In an exemplary embodiment, interaction data may be communicated to a mobile device 110, 140, similar to embodiments utilizing infrared signals.

In yet further embodiments, game devices 102, 107 may incorporate the use of conductive fabrics to monitor interactions. In one such embodiment, a game device 102, 107 may include layers of conductive fabric separated by an insulating material, such that the conductive fabric layers do not interact. Gaps or holes may be disposed within the insulating material, such that when pressure is applied to the fabric, the conductive layers may come in contact with one another through the gaps or holes. This may complete a circuit, indicating to a connected monitoring device that the fabric has been contacted. This data may then be transmitted by a connected transmitter or transceiver to a mobile device 110, 140. A game support application 115 may utilize the data. Therefore, if a game device 102, 107 having the described layers of conductive fabric were to strike an object or be struck, the event may be recognized and communicated.

Even further, in some exemplary embodiments, layer of conductive fabric may cover the surface of game devices 102, 107, such as weapons, armor, clothing, or the like. When the conductive fabric of one game device 102, 107 such as a weapon contacts the conductive fabric of another game device 102, 107, such as armor, clothing, or the like, a circuit may be completed, indicating to a connected monitoring device that an interaction had occurred. Data from the monitoring device may then be transmitted by a connected transmitter or transceiver to a mobile device 110, 140. The result of the interaction may be determined and implemented by a game support application 115 on the mobile device 110, 140.

Figure 2:
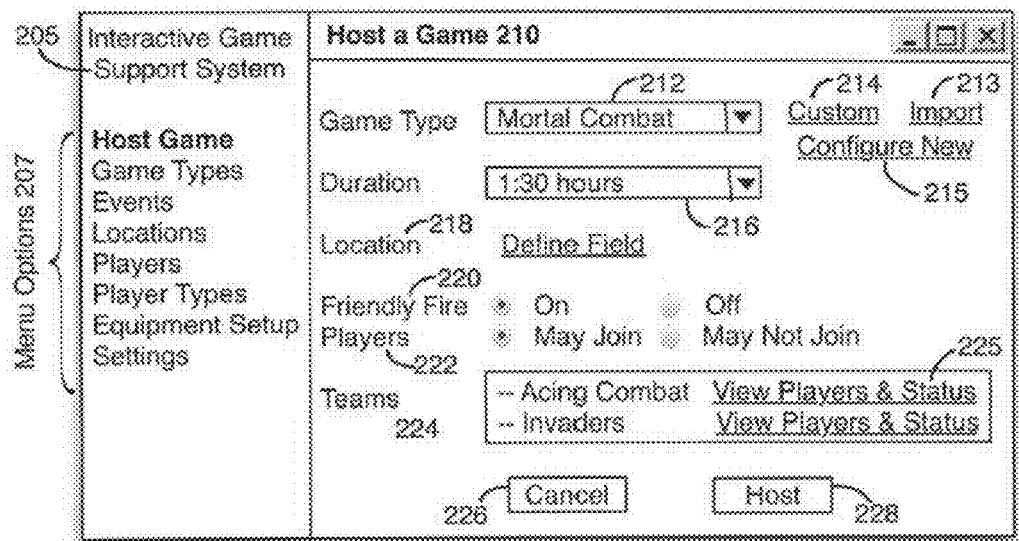
FIG. 2 shows a set of interfaces for a command-control server.
Figure 2:
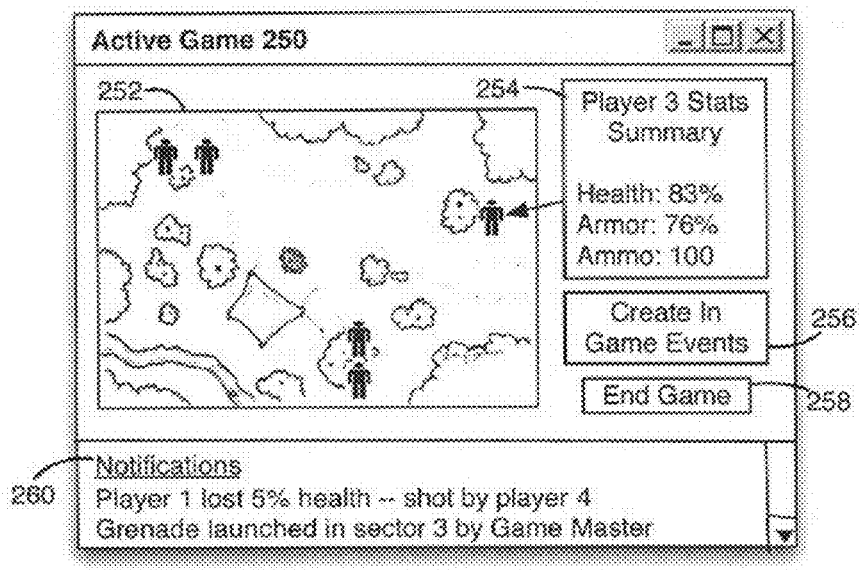

As illustrated in FIG. 2, command control center server 130 can control all aspects of a hosted game, including but not limited to, defining a playing field, allowing players to sign in or out of a hosted game, be assigned equipment, and the like. Command-control center server 130 can also include a data store 132 to maintain user profiles 134 as illustrated in FIG. 1. It should be noted that in one embodiment, the present disclosure can allow for character management. For instance, each player 105, 106 can create a character profile via a website or game support application 115—when they check into a game, using a mobile device 110, 140 to "check them in", the players 105, 106 may be assigned game devices 102, 107 (weapons, protection devices, and accessories), which have been configured for that specific player. Statistics and game results may be stored and shared among mobile devices through game support application 115. When connected to a command-control center server 130 via a network, such as the internet, statistics and game results may be uploaded to the command-control center server 130 and players 105, 106 can then view these statistics, manage their characters, spend earned points, etc. via a webpage. Communication between mobile devices 110, 140 and a command-control center server 130 may be maintained during a game, or data may be uploaded when communication is re-established after a game. In an exemplary embodiment, user interaction with a command-control center server may be facilitated through a webpage. This also means that game plot may use a point-earnings system, where points can be collected, traded and spent on weapons, armor, accessories or ammo upgrades, etc.—each player's game device 102, 107 can be programmed with this character profile. The point-earnings system may operate as a currency among games managed by the game system, or within specific game types. In some exemplary embodiments, the point system may be managed through the game support application on a mobile device.

Network 160, 170 can include any hardware/software/and firmware necessary to convey data encoded within carrier waves. Data can be contained within analog or digital signals and conveyed through data or voice channels. Network 160, 170 can include network equipment and all network or local components required for data to be exchanged between computing device components. Data stores 120, 132, 150 can be a physical or virtual storage space configured to store digital information. Data stores 120, 132, 150 can be in the form of, for example, an optical disk, a semiconductor memory, or any other recording medium as would be understood by a person having ordinary skill in the art.

Each of the devices or components 102, 107, 110, 120, 130, 140, 150 may include hardware (e.g., transceiver 116, GPS 117, speaker 118, microphone 119) as well as zero or more computer program products (e.g., game support application 115). Computer program products can include software and/or firmware. Software, firmware, and/or data used by the executing versions of the same can be stored within one or more tangible storage medium (e.g., data store 120, 132, 150). The embodiments, devices, and components of FIG. 1 are not intended to be exhaustive and other arrangements, for devices and components of FIG. 1 are contemplated. That is, derivatives and alternatives of the hardware/software detailed in FIG. 1 that function to serve substantially equivalent or similar functions are contemplated and are to be considered within the scope of the disclosure.

FIG. 2 is a depiction 200 of a set of web-interfaces 210, 250 that illustrate an exemplary command-control server perspective of a system for interactive role-play support in accordance with an embodiment of the inventive arrangements disclosed herein. The GUIs 210, 250 illustrate examples of a potential command-center server interactive game support system 205. In one embodiment, a game master can maintain a full control over the web component of interactive game support system 205. In another embodiment, players in a game may assign their own game master to set up and host a game pursuant to, for example, GUI 210 or preside over a game as in for example GUI 250.

GUI 210 includes main menu options 207 available to a game master within a central command-control center server or a web version of game support system designed to be accessible by players and interact with game support application 115. Main menu options can include hosting a game, game types, events, locations, players, player types, equipment setup, setting, and the like.

Selecting a "game types" link from a menu 207 may present a game master or player with a list of game types with options to edit predefined game types, add new game types and the like. An events link may present the game master or player with a list of upcoming or past events with options to view past game data, participants (teams and individual players), options to create a new event or edit future event details and invitees, and the like. The settings option can allow for username and password edits, providing information regarding a WS server or posting and the like. A "player types" option on the menu sidebar options 207 can, for example, list player types with player statistics and preset attribute levels, can allow presets to be edited for individual implementations of player types or for all future uses of a specified player type preset.

Host a game GUI 210 can provide a number of selections for configuring and hosting an interactive role playing game and can be available via a website, via the game support application 115 or be managed by an external game master (an individual or robot) through a command-control center server. Options can include defining a game type 212, importing a game type 213, creating a custom game type 214, configuring a new game type 215, and the like. Additionally, the duration 216 of the hosted game, and a location 218 for the hosted game can be set via the host a game GUI 210. Location 218 may, in at least one exemplary embodiment, be defined with GPS points by a mobile device 110, 140. A user may set points by walking to corners and selecting a boundary input control, or manually inputting coordinates as playing field edges. In another embodiment an address field may be used for navigation of a determined location.

Other options such as friendly fire settings 220 (whether friendly fire will result in a player health decline or not), player permissions to join 222 (whether players have to be invited versus voluntarily join) and the like are also contemplated. Moreover GUI 210 can show a list of teams 224, including a respective team's players and player status and details 225. Players 225 can include information such as whether players are checked in to a game, whether players have been assigned equipment and which equipment they are using, players' names, basic user information, statistics and attributes of players, and the like. GUI 210 can also include a cancel button 226 as well as a host button 228 to host a game.

Active Game GUI 250 can present an overview of a currently ongoing interactive role playing game. Active game GUI 250 can include an interactive map 252 to track players in real time and can allow for a player details/statistics view 254 summary. Additionally, GUI 250 can include buttons to create in game events 256 such as launching a grenade, air attack, fireball, and the like as well as a button to end the game 258. Real time notifications 260 can also be included in GUI 250.

Figure 3A:
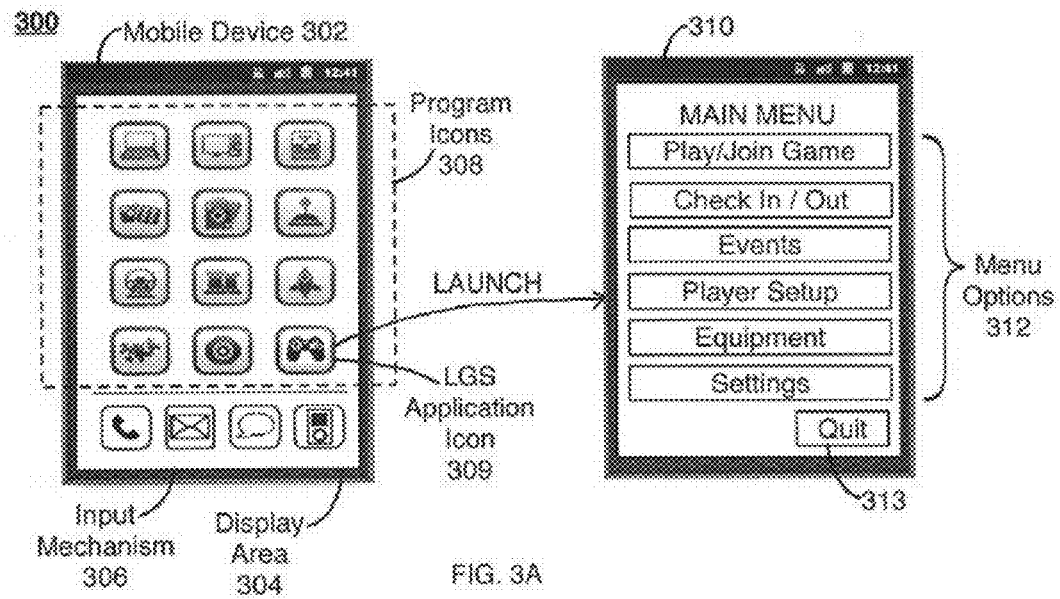
FIG. 3A-3D show mobile graphical user interfaces (GUIs) depicting a game support application.

FIGS. 3A to 3D show exemplary embodiments of mobile graphical user interfaces (GUIs). FIG. 3A shows GUI depictions 300 for an implementation of the current disclosure. It should be noted that the GUI depictions can have different implementations, including variations among mobile platforms (Android, iOS, Windows Mobile, etc.). In collection 300, a mobile device 302 can allow access to the game support system application via its application icon 309. The mobile device can include a display area 304 and an input mechanism 306, which can be one and the same with the display area 304 being used for the input mechanism 306. In another embodiment, input mechanism 306 can be in the form of a keyboard, mouse, touch screen, joystick, other pointer devices, and the like.

The game support application may be presented in addition to other program icons 308 on a mobile device. Selection of the game support application icon 309 may result in the launch of the interactive game support application 309 and display of a main menu 310. Main menu 310 can present the user with high level menu options 312, for example, options to play/join a game, check in or out of a game based on specific servers to connect to, view events and/or RSVP, player setup options, equipment information and settings menus for user id, password settings and the like. Available options may be unique for each user. A quit button 313 may allow the user to exit the application.

Figure 3B:
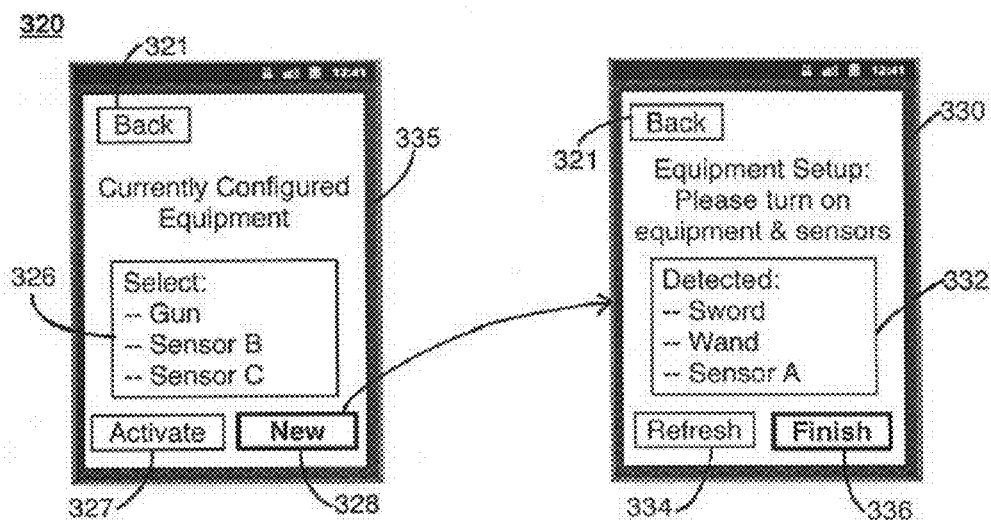

FIG. 3B presents exemplary embodiments of GUIs 320 for equipment (i.e., game device 102, 107) configuration within the mobile device application 115. A back button 321 may allow a user to return to main menu 310 or a previous screen in any submenu configurations. Configured equipment menu 335 can include an equipment selection field 326 that can allow a user to select previously configured equipment to activate 327 for participation in a current game. Alternatively a user may select to configure new equipment via a control 328. Selection of the new equipment control 328 may result in the presentation of a new equipment setup GUI 330, wherein back button 321 may return the user to the currently configured equipment menu 335.

Exemplary equipment setup GUI 330 may include a detection window 332 that can display any captured equipment within range and allow a user to select one or more devices to activate via the finish button 336. In one embodiment a refresh button 334 may restart the detection of new equipment within a device range. Game support application 309 may launch a subsequent GUI with different finish options such as shooting a target such that both the gun and target are configured or pressing a button on the equipment for activation, and the like. In another embodiment, game support application could allow a user to manually key in equipment ID numbers, or scan an equipment barcode, etc. to activate equipment.

Figure 3C:
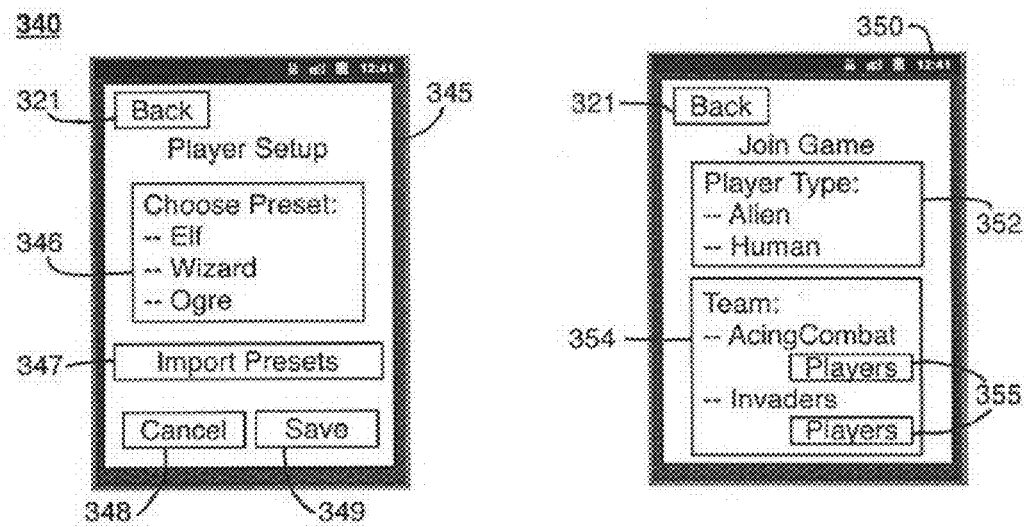

FIG. 3C shows illustrations 340 of exemplary player setup and join game. Each of the presented GUIs may have a back button configured to return a user to the main menu or a previous sub menu depending on application structure. Player setup GUI 345 can present the user with a choose preset option 346 to select predetermined player profiles for a game, an import presets 347 button and the option to cancel 348 or save 349 a selection. Player setup options can be influenced by a player status as checked in or checked out of a game (with a player potentially only being shown player preset options for the current game, when checked in).

A join game GUI 350 may present a player with the option to select a player type 352 and view team display 354 with an option to view team players 355. Team players 355 can include information such as whether players have checked in or not, their player type, and the like. In one embodiment, GUI 350 may lead directly into a join option after player selections are complete or require a password for joining or any other type of authentication as would be understood by a person having ordinary skill in the art.

Figure 3D:
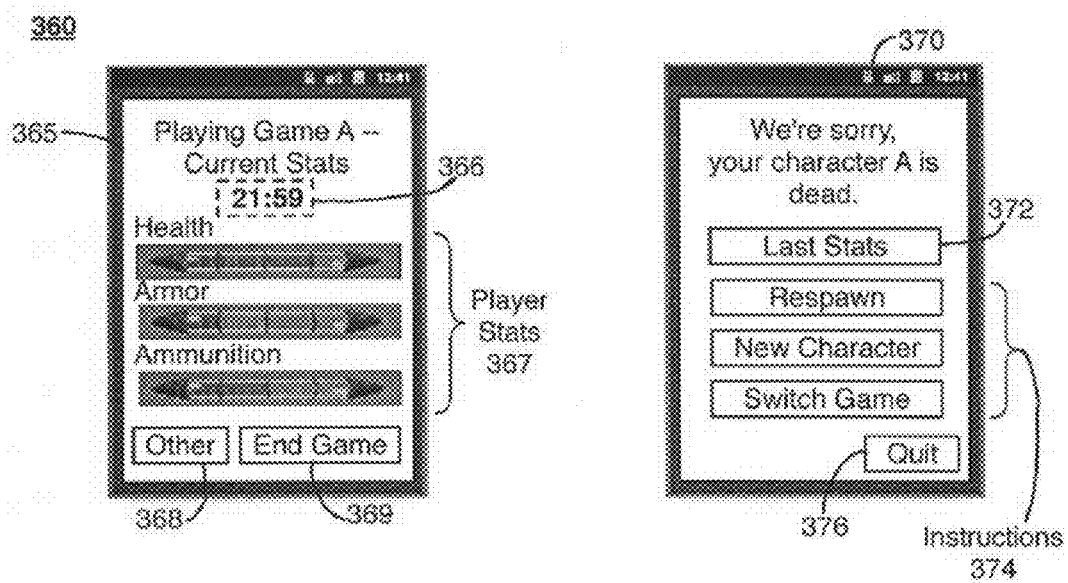

FIG. 3D may show an example 360 of in-game GUIs for an interactive game support system. Playing game GUI 365 (alive and participating players) may present an individual player with a game count down timer 366, which can be customized to display elapsed time, time remaining, or both. Additionally, GUI 365 may display player statistics 367 in, for example graphical or numerical form, or a combination thereof. GUI 365 can also present the user with other 368 statistics options such as team statistics or overall game settings and rules, equipment status and the like. GUI 365 can also include an option to end a game 369. In the alternative to GUI 365, a player may be presented with a player expiration GUI 370 upon player expiration. GUI 370 can include selection such as viewing the player's last stats 372 and providing instructions 374 (for example, to respawn the character, rejoin the game as a new character, or switch game depending on current game setup) or quitting the current game 376.

It should be noted that the quantity of GUIs and their configuration may depend upon the design and implementation of the game support application. As such, components illustrated in FIGS. 3A through 3D are components of an exemplary embodiment of the game support application.

Referring now to FIGS. 4-15, an exemplary system of simulating or monitoring impacts or interactions 400 may be provided. The system of monitoring impacts 400 may include, but not be limited to at least one weapon device 402, at least one body sensor or ID-Tag 404, and a hub 406. Each participant of a game may have at least one of the components of a system of simulating or monitoring impacts. For ease of explanation, weapon devices, body sensors, and hubs may be described without reference to a participant; however, it may be understood by a person having ordinary skill in the art that a simulated impact or interaction may be between a weapon device of at least one participant and a body sensor of at least one different participant.

Figure 4:
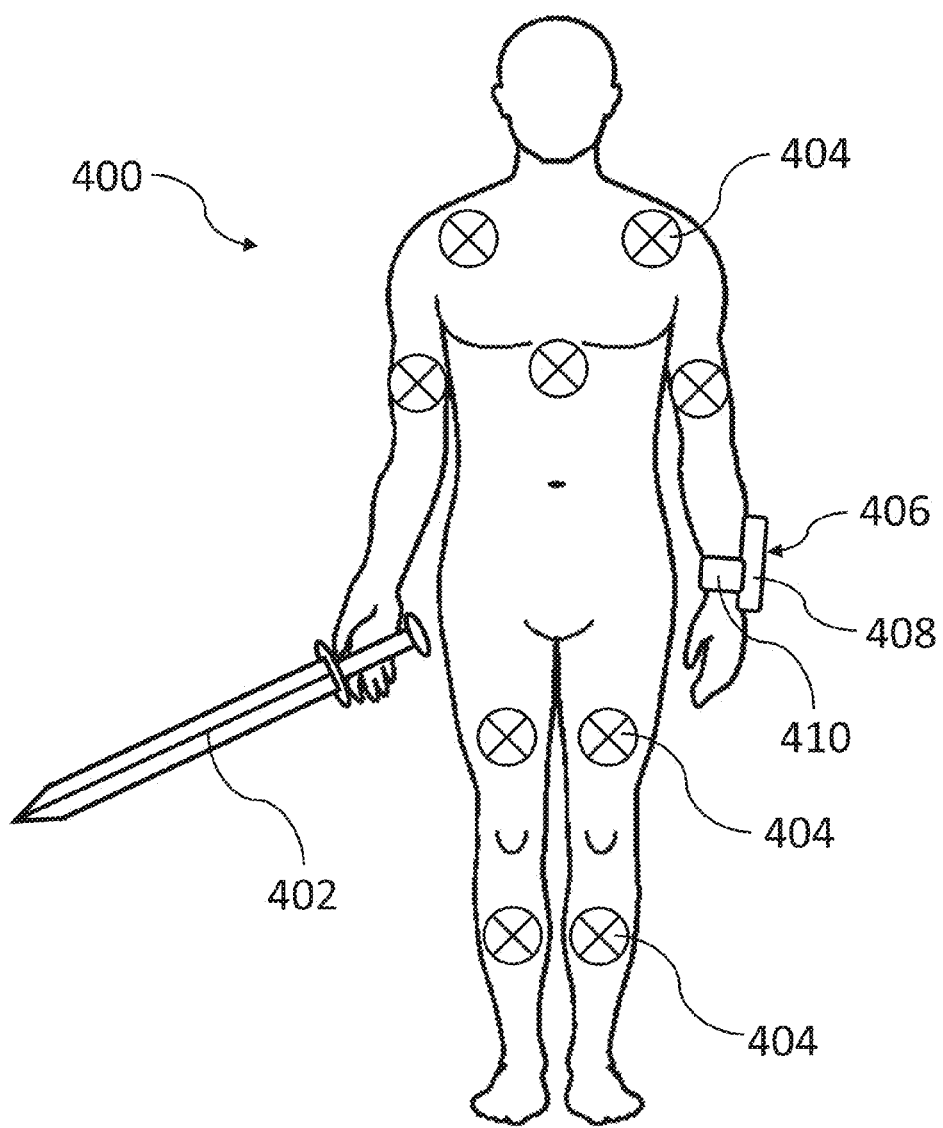
FIG. 4 shows components of an apparatus for monitoring interactions.

In an exemplary embodiment illustrated in FIG. 4, a weapon device 402 may have the appearance of a weapon such as a sword, a magic wand, or a gun. It may be appreciated that the weapon device object may have any desired size and shape, as may be understood by a person having ordinary skill in the art.

Hub 406 may optionally be secured to a user's body. For example, hub 406 may include a housing 408 connected to a strap 410 or other fastening device attached around a user's wrist. It may be appreciated that RF transmission wireless-packets from a body sensor 404 or weapon device 402 may be picked up by a hub 406 within transmission range. In an exemplary embodiment, a hub 406 may ignore wireless-packets from itself and from a body sensor 404 or weapon device 402 belonging to the same user's system of monitoring impacts 400. In yet further exemplary embodiments, a hub 406 may be programmed to ignore wireless-packets from body sensors 404 or weapon devices 402 of other specific participants, including for example, participants belonging to a certain team or class of participants. Further, hub 406 may compare the time information encoded in the packet from body sensor 404 and in the packet from a weapon device 402. If the two time-values are sufficiently close, the hub 406 may flag it as a valid strike from the weapon device 402. The hub 406 may send this information to a user device or smart-phone thru a connection such as, but not limited to, BLUETOOTH, Wi-Fi, and USB connection, as may be understood by a person having ordinary skills in the art. A hub 406 may be linked to specific user's device. A weapon device 402 may trigger a body sensor 404 to send identification and time information by emitting inductive pulses, such as magnetic fluxes, which may be received by the body sensor 404. Once the accelerometer of a weapon device 402 flags little or no movement, the weapon device 402 may stop sending inductive pulses.

Still referring to FIG. 4 the body sensors 404 may be distributed over the user's body. It may be appreciated that any desired number of body sensors 404 may be included in the system of monitoring impacts 400 and may be disposed at any desired locations on the user. It may be further appreciated that every device may be a stand-alone unit with its own power source and microcontroller, with or without any wires connecting one unit to another. In another exemplary embodiment, there may be more than one type of device, depending upon the game or usage type. For example, a Defendant-Sensor might have both Inductive Communication (IC) and Infra-Red (IR) Detector, or just IR Detector.

Figure 5:
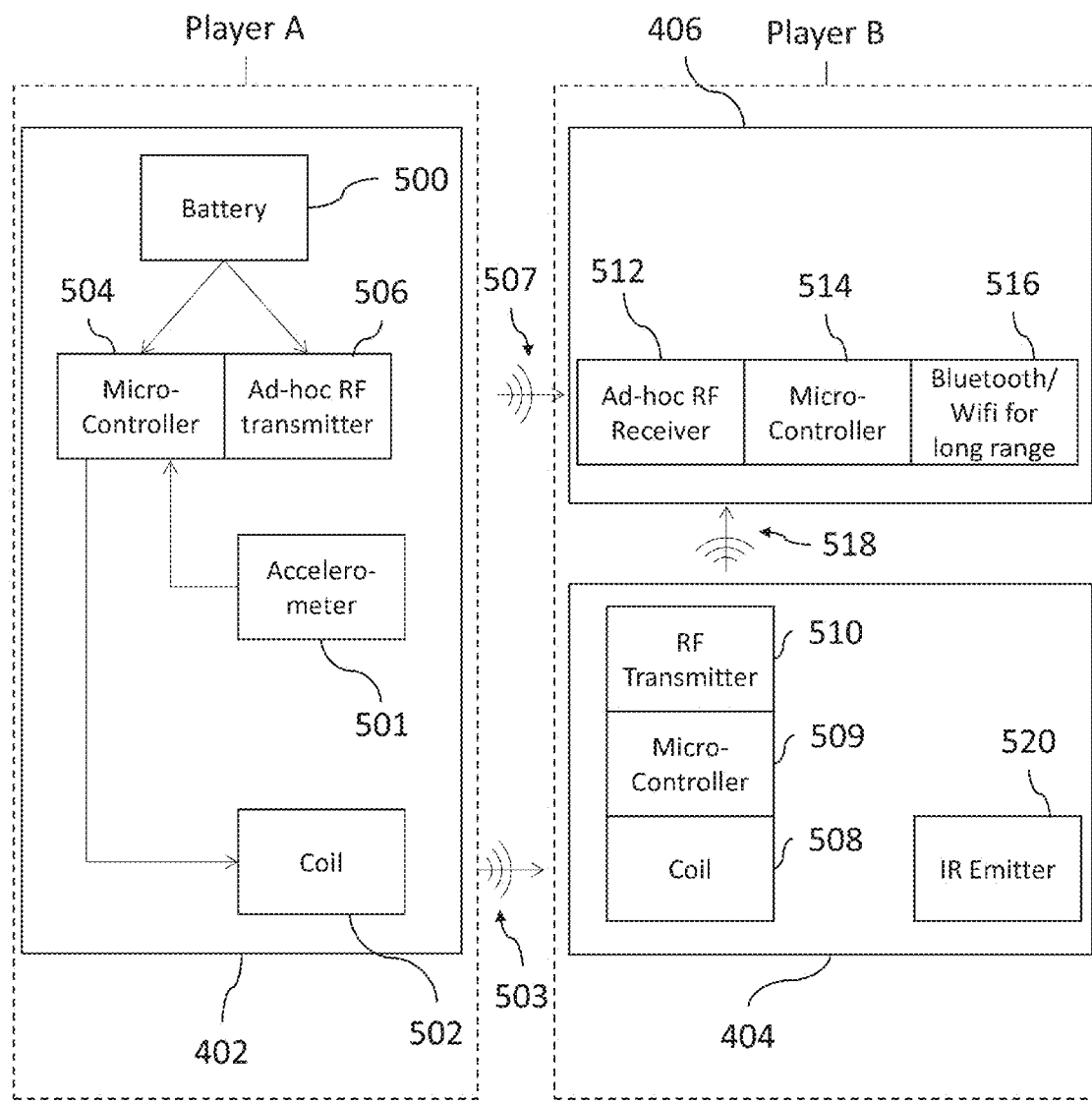
FIG. 5 shows a block diagram of components for monitoring interactions.

In an exemplary embodiment illustrated in FIG. 5, a system of monitoring impacts 400 may be provided. The weapon device 402 may be a stand-alone unit including its own power source 500, a microcontroller 504 connected to an RF transmitter 506, an accelerometer 501, and a coil 502. In an idle state, the weapon device 402 may periodically poll the accelerometer 501 while keeping all other hardware in off-mode. The accelerometer 501 may signal when the weapon device 402 is in motion and when the game element makes an impact. Upon any movement flagged by the accelerometer 501, weapon device 402 may start emitting inductive pulses 503 from the coil 502. The inductive pulses 503 may appear as spikes (for example, approximately 20 microseconds long), instead of data-carrying waves. Further, the inductive pulses may be emitted periodically. In an exemplary embodiment, the inductive pulses may be emitted approximately every 20 milliseconds such that it may actually use the power source 500 only approximately 0.1% of the time. In an exemplary embodiment, the RF transmitter 506 may optionally transmit a weapon ID and time when the accelerometer 501 detects an impact or strike. In an exemplary embodiment, the RF signal 507 may travel up to approximately 10 feet and may be detected by all participants within that range.

Still referring to FIG. 5, a body sensor 404 may include a coil 508, a microcontroller 509, an RF transmitter 510, and an IR emitter 520. During the course of a game, a weapon device 402 may get within range of a body sensor 404. In an exemplary embodiment, the range may be approximately 3 inches to approximately 5 inches of a user's body. The inductive pulses 503 may be picked up by the coils 508 included in one or more body sensor 404. Once an inductive pulse is detected by the coils 508, the information may be passed on to the microcontroller 509 that may activate the RF transmitter 510 and send a signal 518 to the RF receiver 512 included on the defendant hub 406. The signal 518 may optionally include a player/detector ID and a time. If a time transmitted by a sword-ID signal 507 matches a time reported by a player ID signal 518, a valid "Player A" attacked "Player B" event may have occurred.

In an exemplary embodiment, the defendant hub 406 may include, but not be limited to an RF receiver 512, a microcontroller 514, and a wireless transceiver or connection 516 (for example Wi-Fi or BLUETOOTH). It may be appreciated that the defendant hub may be communicatively coupled to a personal computing device such as a mobile phone, as maybe understood by a person having ordinary skill in the art.

In another exemplary embodiment illustrated in FIG. 5, game elements representing non-contact weapons such as guns, archery gear, and magic devices may be used in the game. A similar process may be used, except that, instead of accelerometer 501 driven inductive-emission 503, an IR emitter or detector may be included in the weapon device 402, body sensors 404 or hub 406 and may be activated by voice, by a switch or by any desired action, as may be understood by an person having ordinary skill in the art. The activated IR emitter or transceiver may produce IR-emissions that may be detected by an IR detector or transceiver optionally included in a defendant sensor 404, hub housing 408 or the defendant hub 406.

Figure 6:
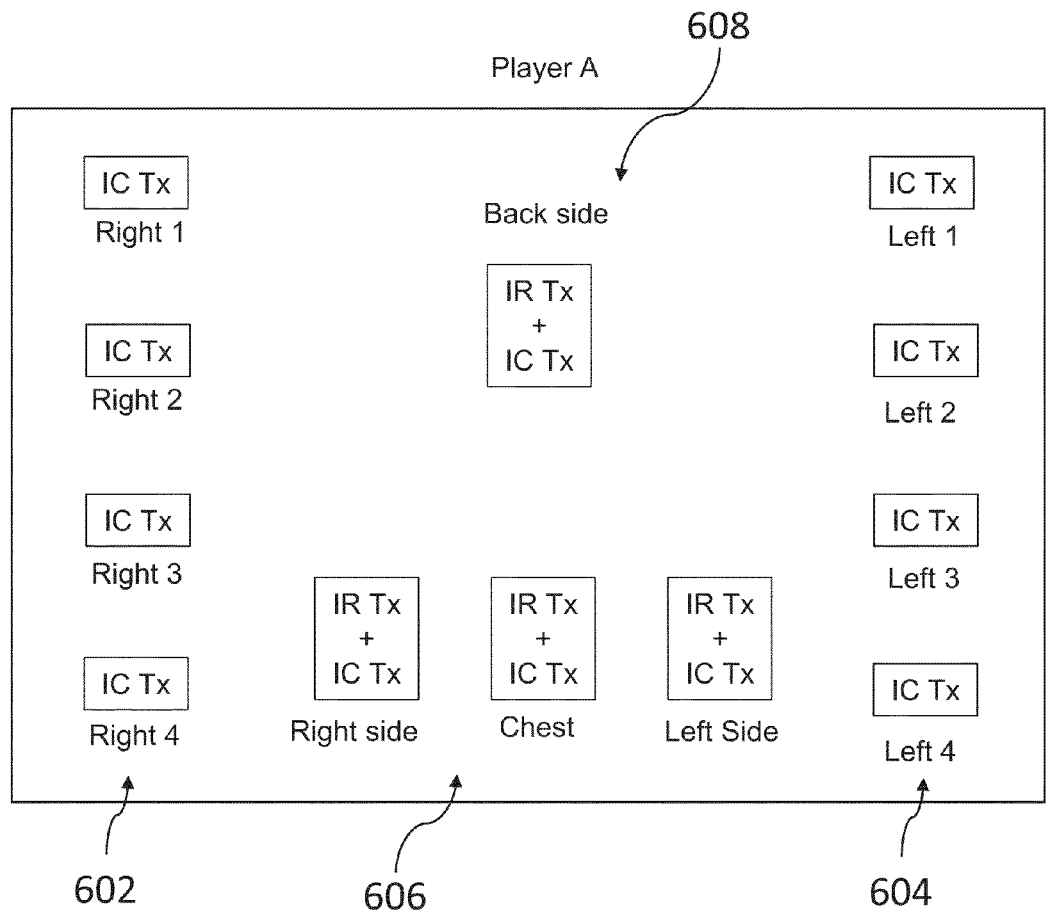
FIG. 6 shows another block diagram of components for monitoring interactions.
Figure 6:
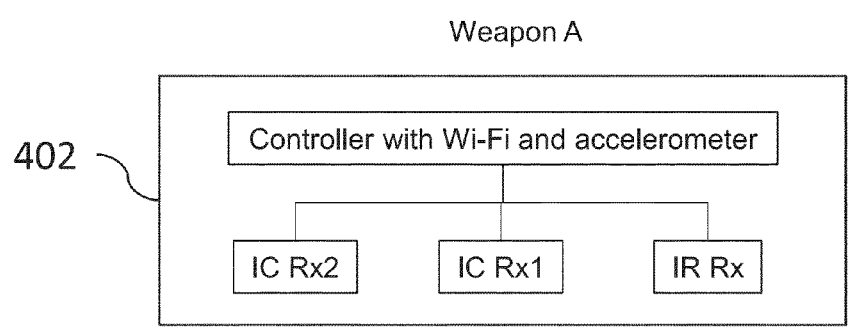

In an exemplary embodiment illustrated in FIG. 6, the system of monitoring an impact may include a number of body sensors on the right side 602, on the left side 604, on the front 606 and on the back 608 of the user. The body sensors may have any desired configuration such as inductive communication transmitter (IC Tx) and infrared transmitters (IR Tx), as may be understood by a person having ordinary skill in the art. Further, communication transmitter (IC Tx) may transmit player ID approximately every 100 milliseconds and the infrared transmitters (IR Tx) may transmit player ID approximately every 250 milliseconds. The weapon device 402 may include inductive communication receivers (IC Rx1 and IC Rx2) and infrared receiver (IR Rx) to detect spell for magic or projectiles. Each participant may optionally have similar components.

Figure 7:
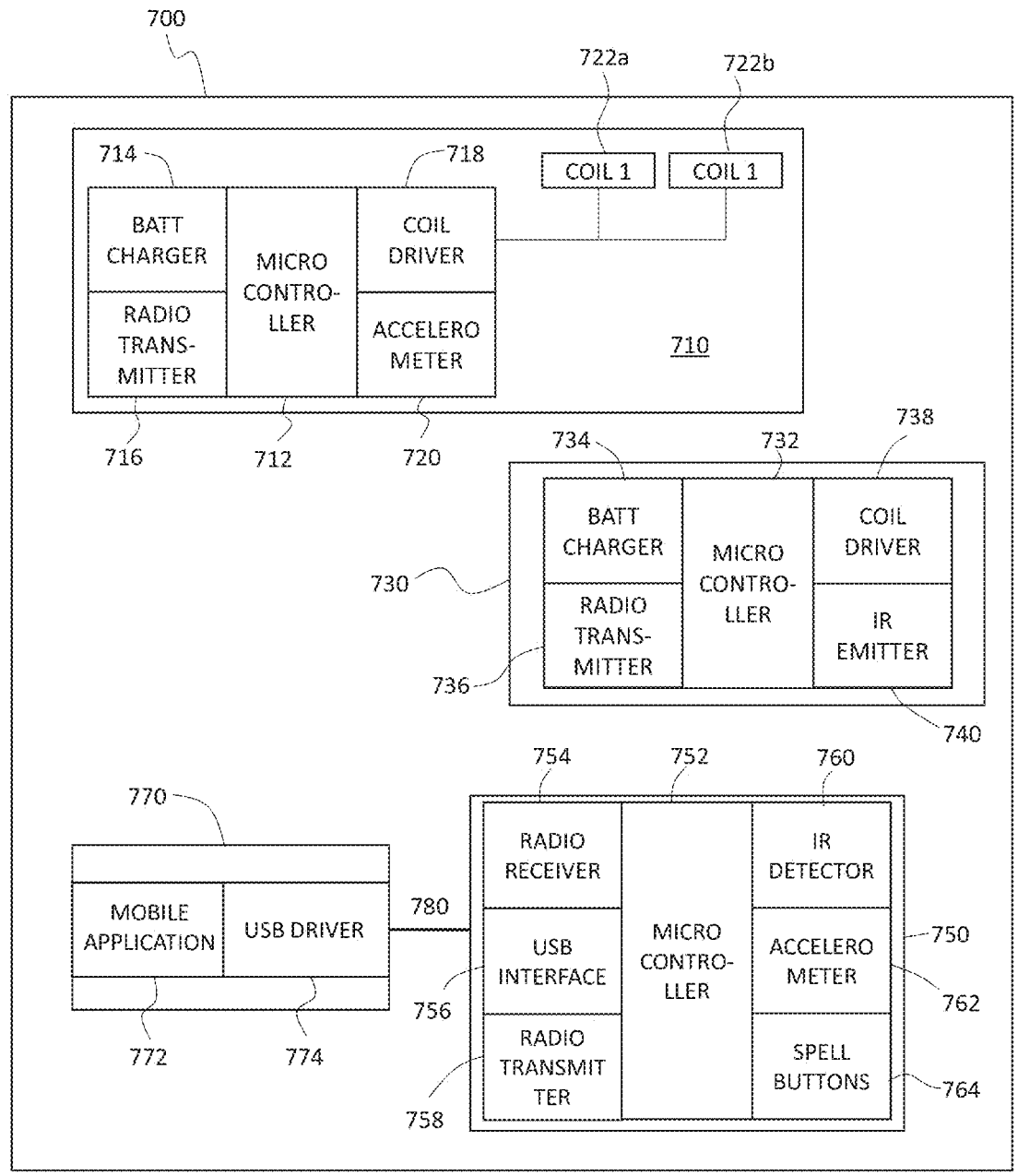
FIG. 7 shows another block diagram of components for monitoring interactions.

In an exemplary embodiment illustrated in FIG. 7, a block diagram of an exemplary participant or player system 700 may be provided. The participant system 700 may include a weapon 710, at least one ID-tag/sensor 730, a hub 750, and a mobile device 770. Weapon 710 may include a microcontroller 712, a battery charger 714, a radio transmitter 716, a coil driver 718, an accelerometer 720, and at least one coil 722a, 722b. A sensor 730 may include a microcontroller 732, a battery charger 734, a radio transmitter 736, a coil driver 738, and an IR emitter 740. A hub 750 may include a microcontroller 752, a radio receiver 754, a USB interface 756, a radio transmitter 758, an IR detector 760, an accelerometer 762, and spell buttons 764. A mobile device 770, such as a smartphone, may include an installed game application 772 and may have a USB driver 774. A mobile device 770 may be communicatively coupled to hub 750 by a USB connection 780. However, in some alternative exemplary embodiments, the connection may be a wireless connection 780 or other connection as would be understood by a person having ordinary skill in the art.

Figure 8:
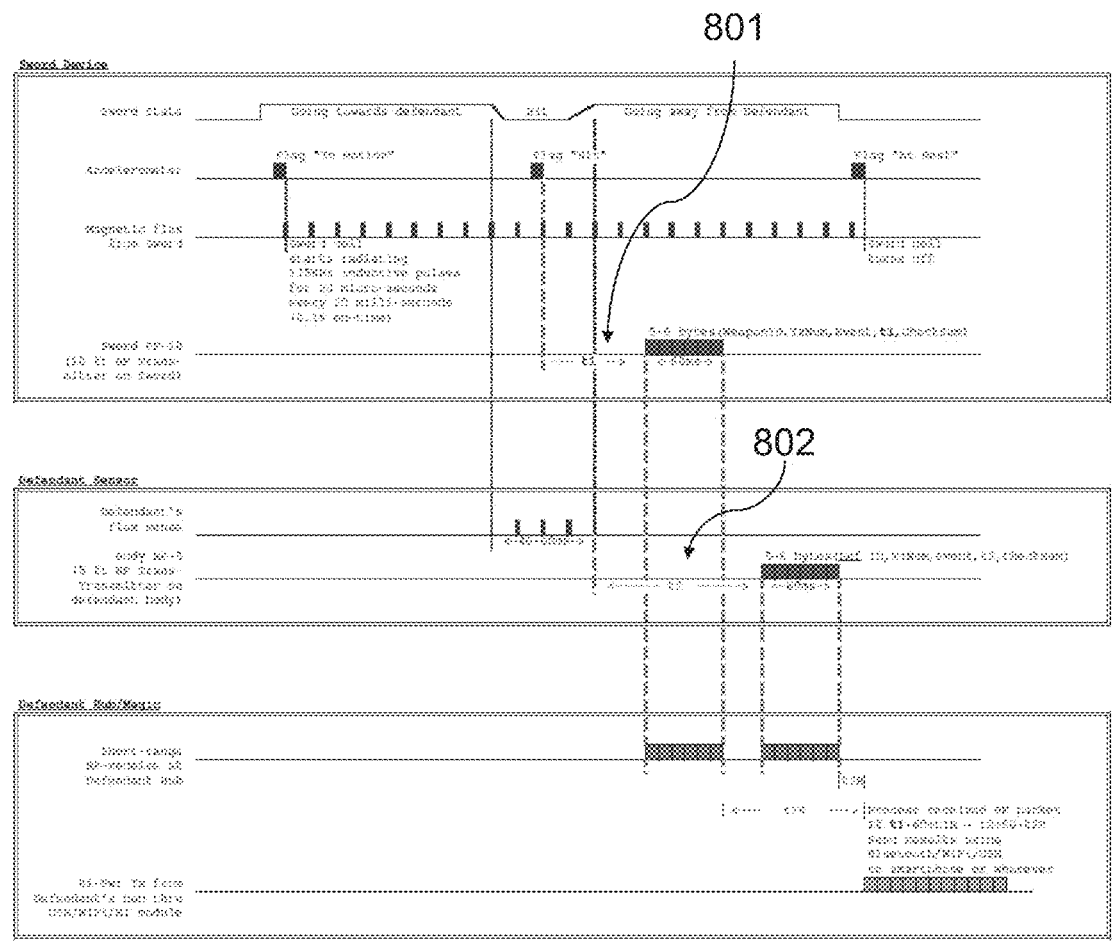
FIG. 8 shows a time chart of an interaction.

In an exemplary embodiment illustrated in FIG. 8, inductive pulses may optionally cause a body sensor to wake up from an off-mode, which may then blindly send Sensor-ID, t1 (time since inductive pulse, which may be in milliseconds) 801 aimed for "Defendant Hub" through a low-power wireless-packet. In an exemplary embodiment, the wireless-packet may be powerful enough to be detected up to approximately 4 to approximately 6 feet.

The accelerometer included in the weapon device may or may not flag an impact if the weapon device is only swinging near but does not hit. If the weapon device flags an impact, it may additionally send information including, but not limited to, the weapon-ID, an attack-intensity, and the t2 (time since impact, which may be in milliseconds) 802 to the defendant hub 406. This transmission may be achieved through a low-power RF transmission wireless-packet. In an exemplary embodiment, the low-power RF transmission wireless-packet may have a range of approximately 0 to approximately 15 feet. Multiple wireless packets, including from a defendant sensor and from a weapon, may be in-the-air simultaneously. These wireless packets may further be picked up by multiple defendant hubs within range. A hub 406 may ignore packets from itself and any defendant sensor packet not including the ID of the defendant. If the ID in a packet from a defendant sensor belongs to a hub 406, the hub 406 may compare the time information encoded in the packet from the defendant sensor and in the packet from the weapon. If the time-values are sufficiently similar, hub 406 may flag a valid strike from a weapon and communicated the attack information to an associated participant's mobile device. The attack information may be communicated wirelessly or through a wired connection, such as a USB connection. The RF transmission system in the weapon device 402 may optionally return to off-mode when the transmission of the weapon wireless packet is competed.

Figure 9:
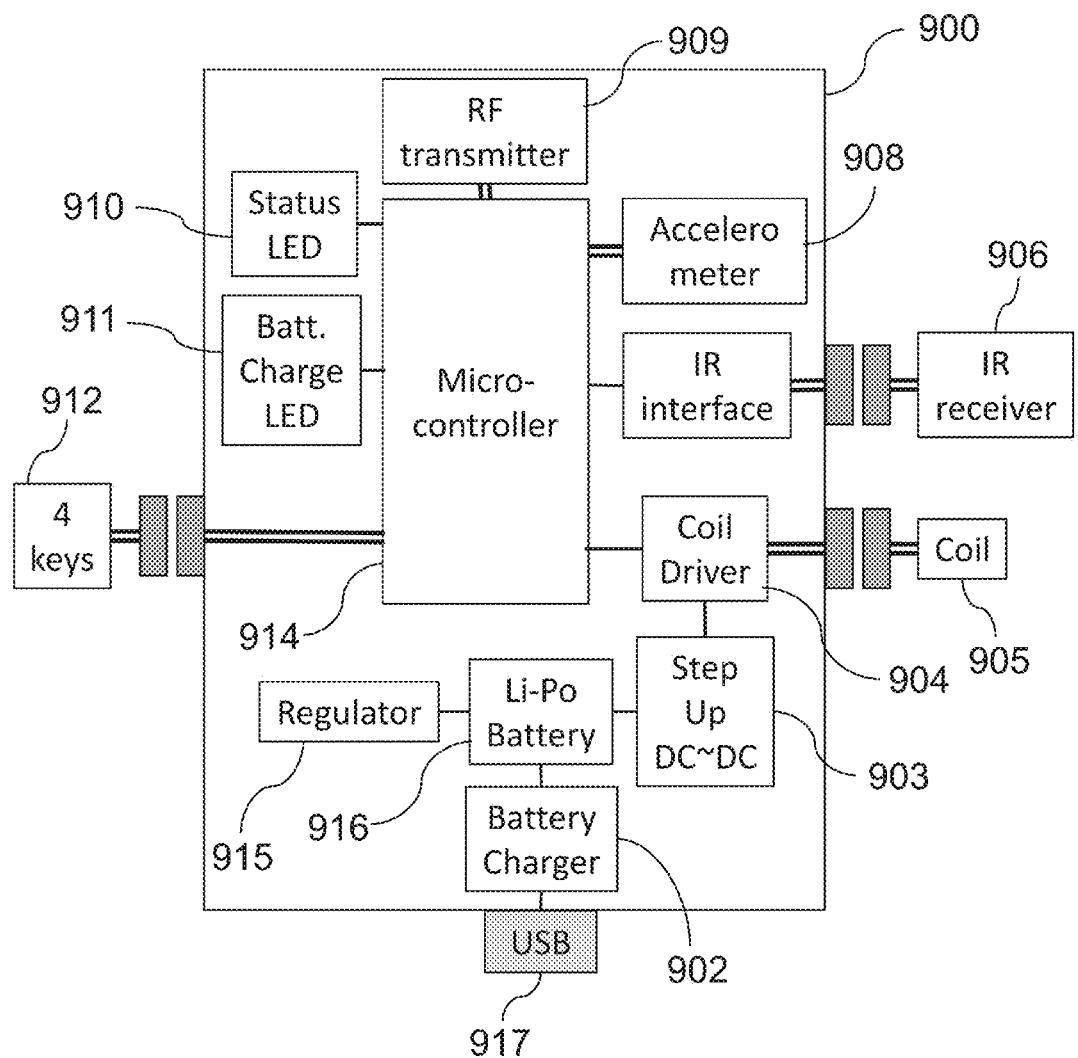
FIG. 9 shows a another block diagram of components for monitoring interactions.

Now referring to FIG. 9, an exemplary weapon device may be provided. In an exemplary embodiment, a weapon device 900 may be built around a microcontroller 914 connected to a number of electronic components including, but not limited to, Keys 912, status LED 910, battery charge LED 911, RF transmitter 909, an accelerometer 908, and an IR interface 907 connected to an IR receiver 906. The microcontroller 914 may further be connected to a coil driver 904 coupled to a coil 905 and to a power supply assembly that may include a step up 903, a Li—Po battery 916, a regulator 915, and a battery charger 902 equipped with a USB port 917, as may be understood by a person of ordinary skill in the art.

Figure 10:
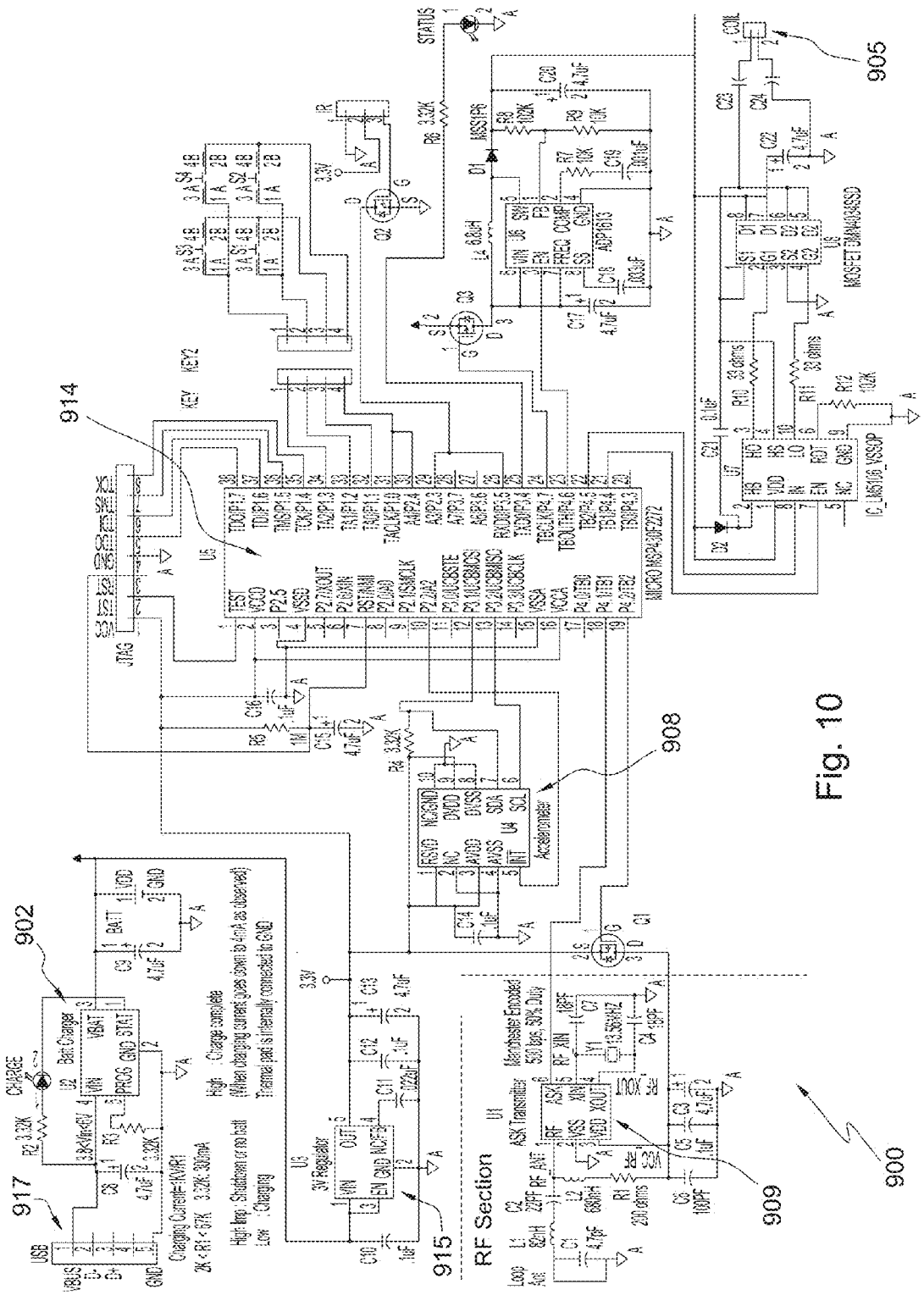
FIG. 10 shows a wiring diagram of a weapon device.
Figure 11:
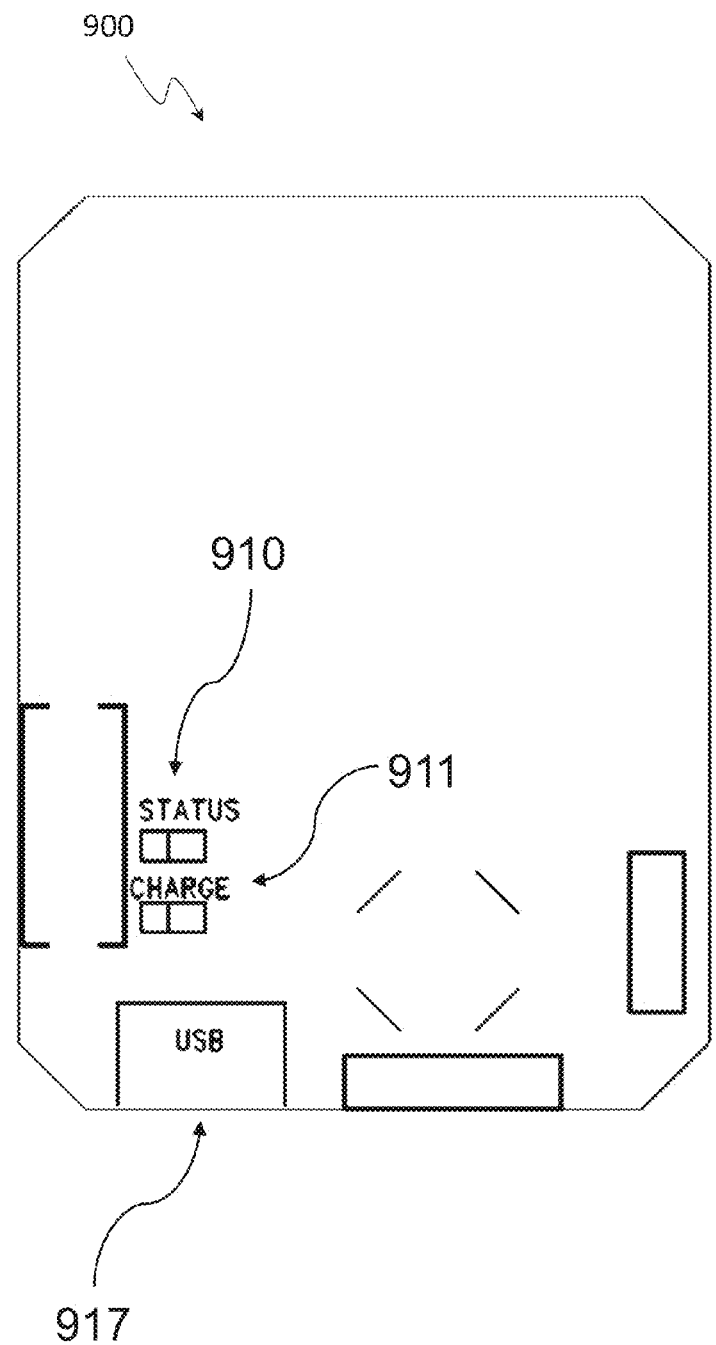
FIG. 11 shows a weapon device circuit.

In an exemplary embodiment illustrated in FIG. 10, a wiring diagram for an exemplary weapon device 402 may include, but not be limited to, microcontroller 914, accelerometer 908, coil 905, RF transmitter 909, battery charger 902, USB port 917 and regulator 915 as may be understood by a person having ordinary skills in the art. Further, a USB port 917, status LED 910, and battery charge LED 911 of an exemplary embodiment may be illustrated in FIG. 11.

Figure 12:
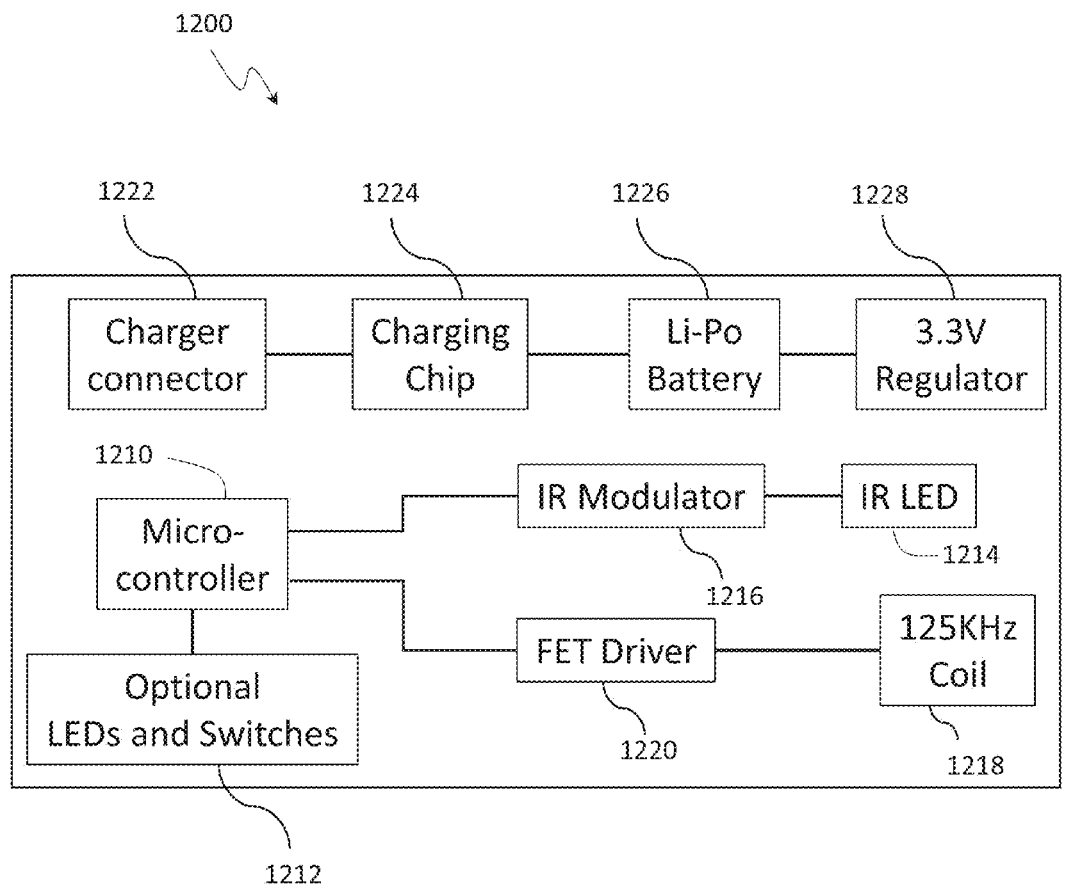
FIG. 12 shows a block diagram of an ID-tag.

In an exemplary embodiment illustrated in FIG. 12, a block diagram of an exemplary transmitter 1200 may be provided. An exemplary ID-tag/body sensor transmitter 1200 may include a micro-controller 1210 and optional LEDs and switches 1212. An IR LED 1214 may be communicatively coupled with the micro-controller 1210 through an IR modulator 1216. A coil 1218, such as a 125 KHz coil, may be communicatively coupled with microcontroller 1210 through a FET driver 1220. An exemplary transmitter may further optionally include a charger connector 1222, a charging chip 1224, a battery 1226, such as but not limited to a Li—Po battery, and a regulator 1228, such as but not limited to a 3.3V regulator, as would be understood by a person having ordinary skill in the art.

Figures 13A, 13B, 13C:
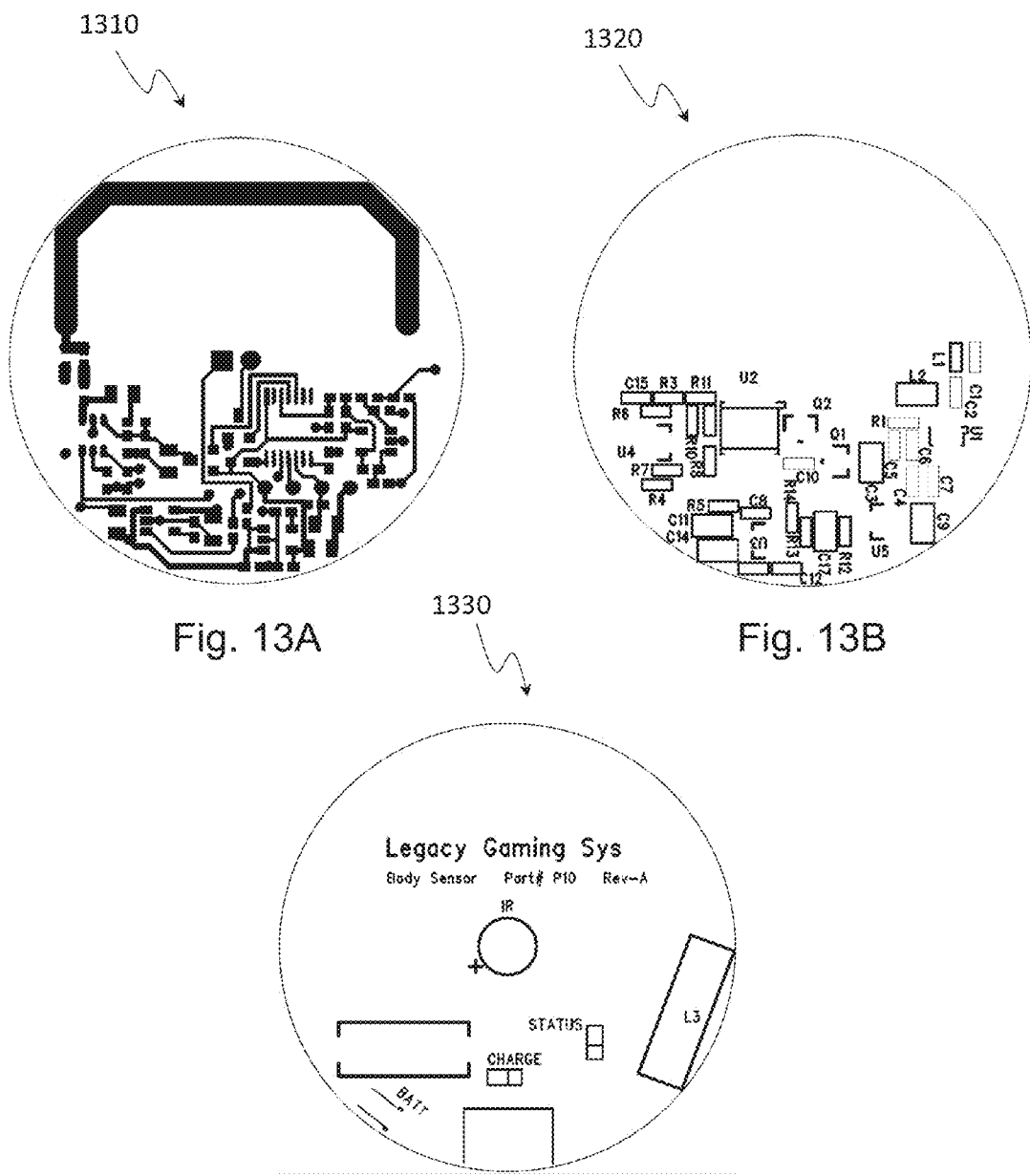
FIG. 13A shows a body sensor circuit.
FIG. 13B shows a body sensor circuit.
FIG. 13C shows a body sensor circuit.
Figure 14:
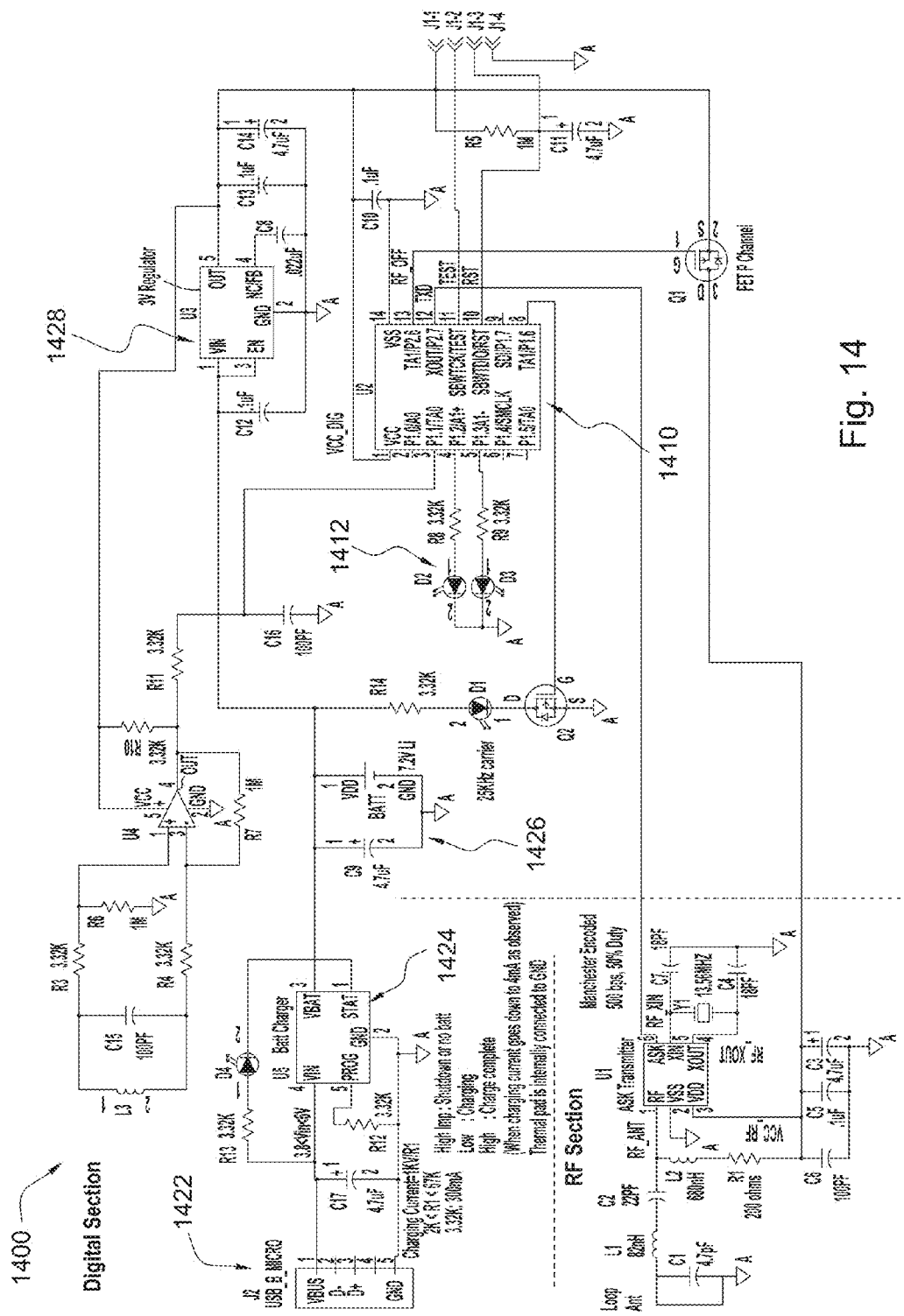
FIG. 14 shows a wiring diagram of a body sensor.

In an exemplary embodiment illustrated in FIG. 13A to FIG. 13C, exemplary circuit configurations 1310, 1320, and 1330 for body sensors may be provided. A wiring diagram for an exemplary body sensor may further be provided in exemplary FIG. 14. An exemplary body sensor 1400 may include a micro-controller 1410 and optional LEDs and switches 1412. An exemplary body sensor 404 may further optionally include a charger connector 1422, a charging chip 1424, a battery 1426, such as but not limited to a Li—Po battery, and a regulator 1428, such as but not limited to a 3.3V regulator, as would be understood by a person having ordinary skill in the art.

Figure 15:
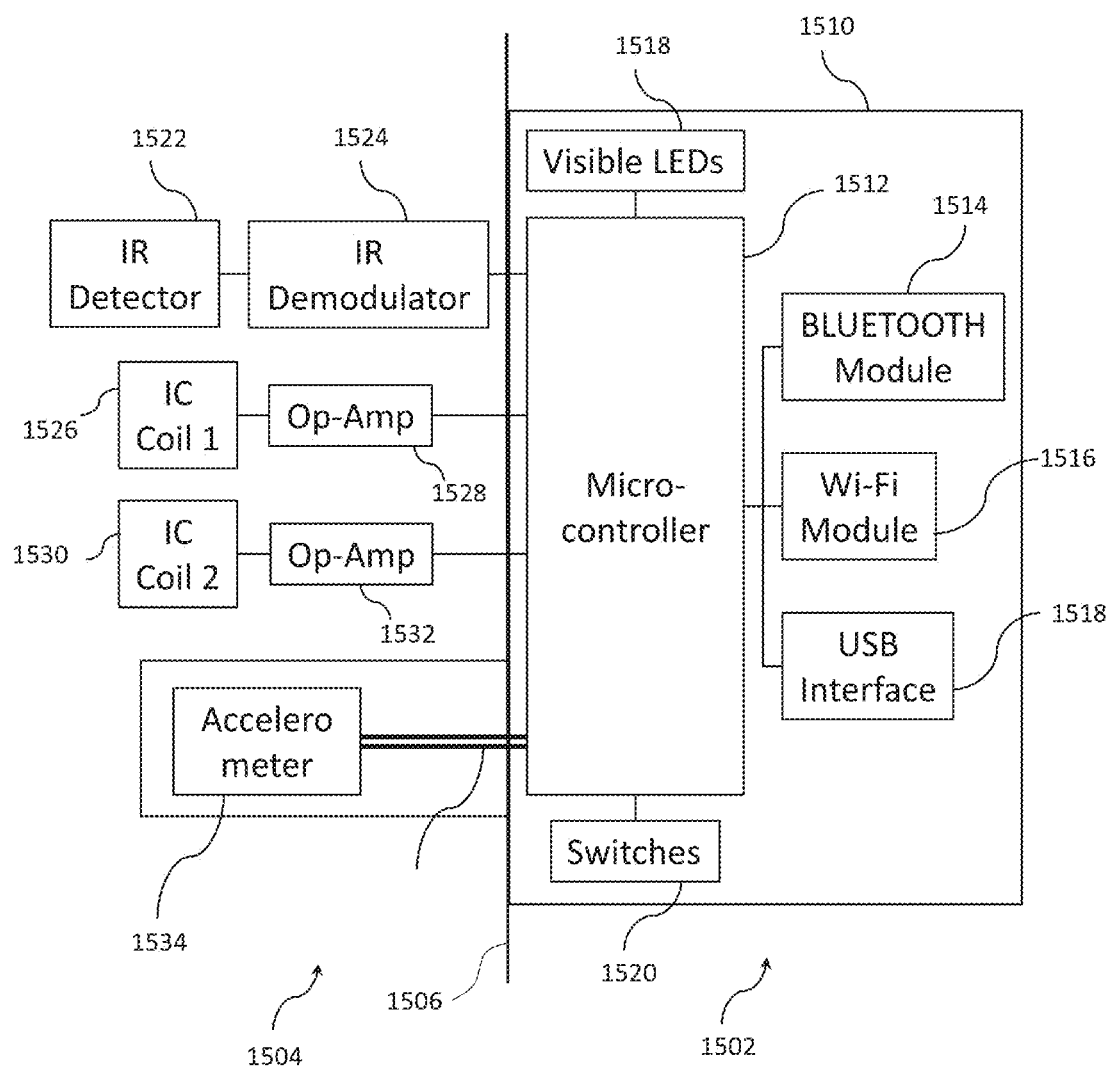
FIG. 15 shows a block diagram of components for monitoring an interaction.

In an exemplary embodiment illustrated in FIG. 15, a block diagram of an exemplary receiver 1500 may be provided. A receiver 1500 may include a transducer side 1504, a digital processing side 1502, and an optional connector 1506. An exemplary receiver may include a central receiver 1510 on a digital processing side 1502. The central receiver may include a micro-controller 1512. The central receiver may optionally further include at least one of a Bluetooth module 1514, a Wi-Fi module 1516, or a USB interface 1518. Central receiver 1510 may optionally include visible LEDs 1518 and may optionally include switches 1520. Central receiver 1510 may receive a digital input from an IR detector 1522 through an IR demodulator 1524. Central receiver 1510 may receive a first analog input from a first inductive communication coil 1526 through a first operational amplifier 1528. Central receiver 1510 may receive a second analog input from a second inductive communication coil 1530 through a second operational amplifier 1532. Additional digital or analog inputs may optionally be provided for. Central receiver 1510 may further communicate with an accelerometer 1534 on a transducer side 1504.

Now referring to exemplary FIG. 16 and FIG. 17, the above described hardware may be used to manage events within a game as follows. A participant may set-up an exemplary system by linking the hardware components 1602. This may be performed by adding and identifying hardware devices in a game application on a participant's mobile device. Setting up the hardware may allow the game devices to communicate properly. A participant may setup a spell through the game application by selecting a spell name and power and identifying a button for triggering the spell 1700, as shown in FIG. 17. Once set, the spell information may be communicated to a hub and may optionally be stored in the hub's non-volatile memory.

Figure 16:
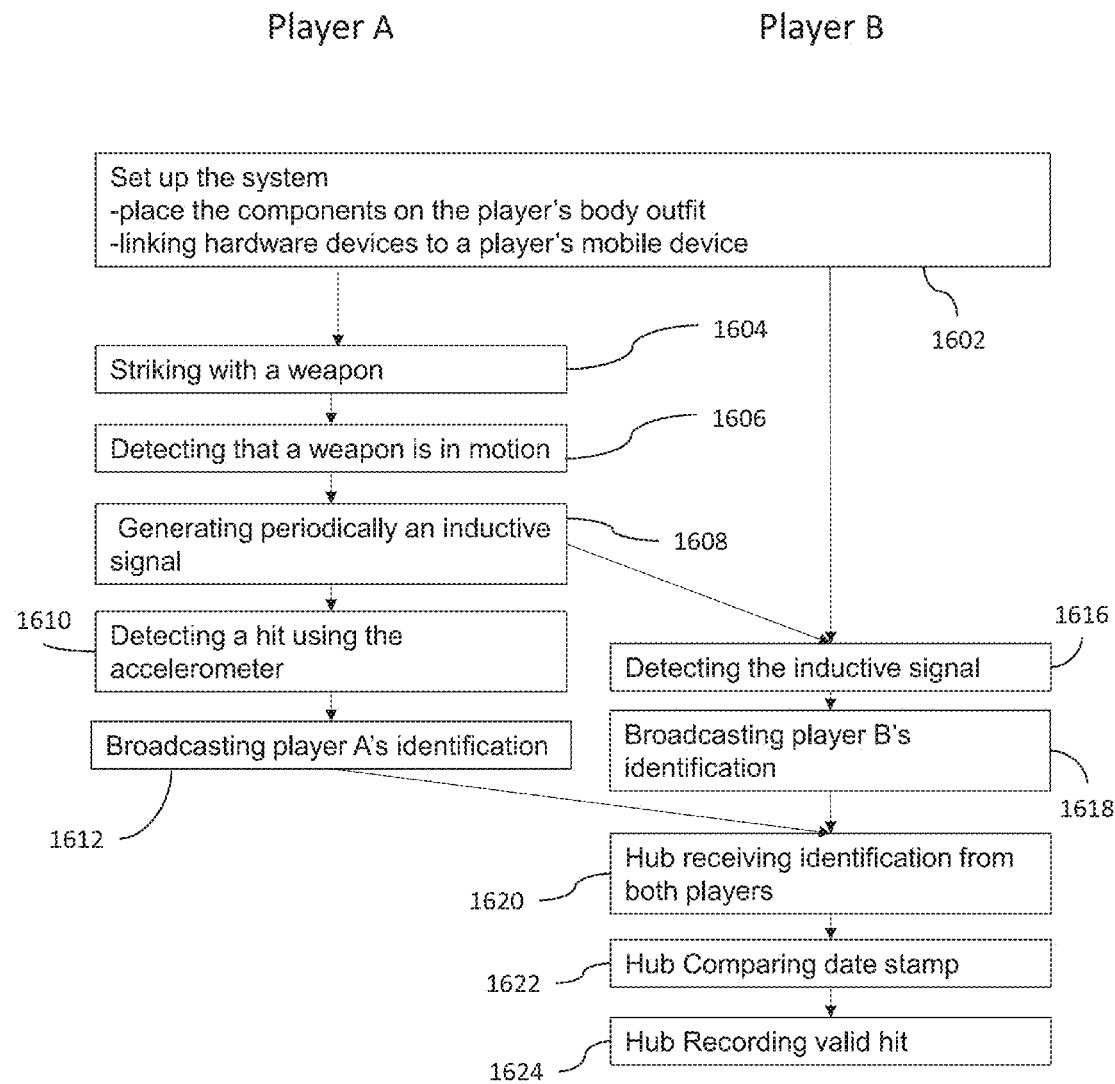
FIG. 16 shows a flow chart for monitoring an interaction.
Figure 17:
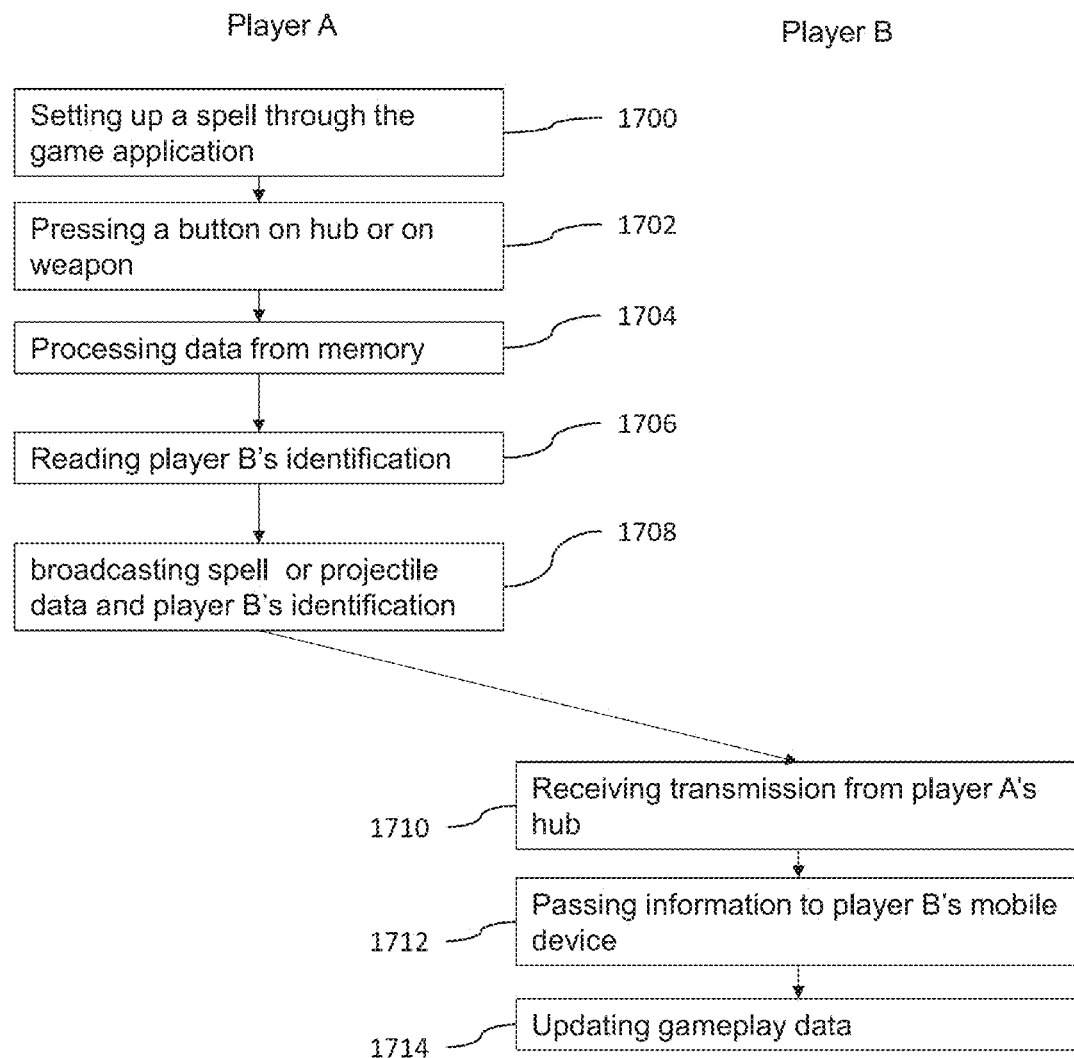
FIG. 17 shows a flow chart for monitoring an interaction.

An exemplary weapon strike, such as a sword strike 1604, may be monitored as illustrated in FIG. 16. A first participant's weapon device may detect that the weapon is in motion 1606, causing the weapon device to periodically generate an inductive signal 1608. In an exemplary embodiment, the signal may be for approximately 32 mcs and may be generated approximately every 10 ms. An ID-tag or sensor on a second participant may detect the inductive signal when the first participant's weapon device is within the vicinity 1616, whether or not the contact is made. When the first participant's weapon device detects a hit using its accelerometer 1610, it may broadcast identification 1612, such as a serial number, indicating that it registered a hit. The identification of the sensor may not be known by the weapon device. The second participant's ID-tag or sensor may broadcast identification 1618, such as a serial number, indicating that it received an inductive signal. The identification of the weapon device may not be known by the sensor. The second participant's hub may receive the signals 1620 and compare time-stamps from the ID-tag or sensor and the weapon device 1622. Communication from a first participant's device or weapon may be directly to the defendant or directed through the first participant's hub. If matching time-stamps are found, a valid hit may be recorded 1624. The hub may then report the weapon device identification, such as a serial number, to the mobile device. The game application may update gameplay data based on the received information. Gameplay data may further optionally be reported to a game server.

An exemplary casting of a spell may be monitored as illustrated in FIG. 17. Player A may cast a spell on Player B by pressing a spell button on Player A's hub (Hub-A) 1702. Hub-A may process the spell data from its memory 1704. Hub-A may read Player B's ID-tag or sensor (ID-Tag-B) identification 1706, such as a serial number, through an IR detector, if Player B is within the vicinity. Hub-A may broadcast the identification of ID-Tag-B, a spell identifier, spell power, and any other spell data, as would be understood by a person having ordinary skill in the art 1708. Player B's hub (Hub-B) may receive the transmission from Hub-A 1710. Hub-B may pass the information to Player B's mobile device 1712. In an exemplary embodiment, this may optionally be through a USB connection. Player B's mobile device may verify that ID-Tag-B is associated with Player B and may subsequently update gameplay data 1714. The system may continue monitoring based on specific spell information. For example, if a freeze spell is successfully cast, a game application on Player B's mobile device may instruct Hub-B to monitor for movement. If movement is detected through Player B's devices, Hub-B may report the movement to the game application. When a freeze expires, Player B's mobile device may instruct Hub-B to stop monitoring for movement. If movement is detected during a freeze, Hub-B may report the movement to the game application.

In yet another exemplary embodiment, projectiles fired from a weapon may be monitored as illustrated in FIG. 17. An attacking participant's hub, Hub-A, may read a second participant's ID-Tag, ID-Tag-B, for identification, such as a serial number, through Hub-A's IR detector 170. Hub-A may broadcast ID-Tag-B's identification and a number of projectiles. The second participant's hub, Hub-B, may receive the transmission from Hub-A 1710. Hub-B may communicate the information to a game application on the second participant's mobile device 1712. The second participant's mobile device may verify that ID-Tag-B is associated with the second participant and may subsequently update gameplay data as necessary 1714. In some exemplary embodiments, projectile data, such as a number of projectiles, may be predetermined or may be controlled by buttons similar to the selection of spells, as would be understood by a person having ordinary skill in the art.

In an exemplary embodiment, sound may be played through a participant speaker or headphone when an interaction is monitored. An exemplary system may further be capable of detecting a weapon-strike that is too strong based on pre-defined parameters. Such detection may be used to regulate gameplay and may be dealt with as desired by game participants. In some exemplary embodiments, a system may be set not to count weapon strikes deemed to be too strong. Further, an exemplary system may be capable of operating for at least 24 hours on a single charge and may have a charging time of approximately 10 to approximately 20 minutes. In some exemplary embodiments, participant mobile devices may be capable of communicating with a server or other participants' mobile devices to manage gameplay.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. An apparatus for monitoring interactions, comprising:
a weapon device associated with each participant;
at least one body sensor located on each participant's body; and
a hub associated with each participant;
wherein a weapon device of an attacker is configured to communicate the weapon device's presence by emitting inductive pulses when an accelerometer in the weapon detects motion, the inductive pulses may be detected by at least one body sensor of a defendant within communication range, the weapon device is further configured to transmit an identification and a time-stamp when the accelerometer in the weapon device detects a hit,
wherein the at least one body sensor of the defendant having received the communication of the weapon device's presence is configured to transmit an identification and a time-stamp to the hub of the defendant,
wherein a valid interaction is determined by matching the time-stamps transmitted by the weapon device of the attacker and the at least one body sensor of the defendant, and
wherein the hub of each participant is configured to communicate monitored interaction data to a game application on a mobile device.

2. The apparatus of claim 1, the weapon device further comprising a battery, a microcontroller, an RF transmitter, an accelerometer, and a coil;
the at least one body sensor further comprising a microcontroller, an RF transmitter, and a coil; and
the hub further comprising a microcontroller, an RF receiver, and a Bluetooth or WiFi transceiver.

3. The apparatus of claim 1, wherein the weapon device communicates the weapon device's presence by emitting inductive pulses when the accelerometer of the weapon device detects motion.

4. The apparatus of claim 1, further comprising at least one body sensor positioned on a participant's back, at least one body sensor positioned on a participant's chest, at least one body sensor positioned on a participant's right side, and at least one body sensor positioned on a participant's left side.

5. The apparatus of claim 1, wherein the hub is communicatively coupled to a mobile device by Bluetooth connection.

6. The apparatus of claim 1, further comprising a game server configured to communicate with the game application.

7. The apparatus of claim 1, wherein the weapon device further comprises an IR emitter configured to produce IR-emissions for detection by an IR detector in the at least one body sensor of the defendant.

8. A method of monitoring a weapon strike comprising:
linking participant hardware components;
causing an attacker's weapon device to communicate its presence by emitting inductive pulses when motion is detected by an accelerometer;
causing a defendant's body sensor to communicate its identification and time to a defendant's hub when the defendant's body sensor detects the inductive pulses of the attacker's weapon;
causing the attacker's weapon device to communicate an identification and time when the accelerometer of the attacker's weapon device detects a hit;
matching identification and time data from the attacker's weapon device and the defendant's body sensor to determine a valid strike; and
reporting the valid strike to a game application on a mobile device.

9. The method of claim 8, further comprising allowing the game application to update gameplay data based on the strike.

10. The method of claim 8, further comprising communicating the gameplay data to a game server.

* * * * *